United States Patent [19]

Foster et al.

[11] Patent Number: 5,934,445

[45] Date of Patent: Aug. 10, 1999

[54] CONTINUOUSLY ADVANCING RECIPROCATING SLAT CONVEYOR

[75] Inventors: Raymond Keith Foster, P.O. Box 1, Madras, Oreg. 97741; Randall M. Foster; Kenneth A. Stout, both of Madras, Oreg.

[73] Assignee: Raymond Keith Foster, Madras, Oreg.

[21] Appl. No.: 08/827,620

[22] Filed: Apr. 9, 1997

Related U.S. Application Data

[60] Provisional application No. 60/015,235, Apr. 10, 1996.

[51] Int. Cl.$^6$ .................................................. B65G 25/00
[52] U.S. Cl. ..................................... 198/750.5; 198/750.2
[58] Field of Search ............................. 198/750.1, 750.2, 198/750.5, 705.7, 750.6

[56] References Cited

U.S. PATENT DOCUMENTS

| | | | |
|---|---|---|---|
| 3,534,875 | 10/1970 | Hallstrom, Jr. | 214/83.3 |
| 4,144,963 | 3/1979 | Hallstrom | 198/750 |
| 4,508,211 | 4/1985 | Foster | 198/750 |
| 4,580,678 | 4/1986 | Foster | 198/750 |
| 4,748,894 | 6/1988 | Foster | 91/176 |
| 4,793,468 | 12/1988 | Hamilton et al. | 198/750 |
| 4,793,469 | 12/1988 | Foster | 198/750 |
| 4,858,748 | 8/1989 | Foster | 198/750 |
| 4,896,761 | 1/1990 | Foster | 198/750 |
| 5,063,981 | 11/1991 | Jonkka | 144/341 |
| 5,340,264 | 8/1994 | Quaeck | 414/525.9 |
| 5,350,054 | 9/1994 | Foster | 198/750 |
| 5,373,777 | 12/1994 | Foster | 92/85 |
| 5,390,781 | 2/1995 | Foster | 198/750 |
| 5,469,603 | 11/1995 | Stover | 19/80 R |

FOREIGN PATENT DOCUMENTS 6706657  11/1968  Netherlands.

*Primary Examiner*—James R. Bidwell
*Attorney, Agent, or Firm*—Joan H. Pauly; Delbert J. Barnard

[57] ABSTRACT

In a reciprocating slat conveyor, at least three slat sets of at least one slat (CS) each are driven by piston-cylinder drive units (26), one for each slat set. Each drive unit (26) is provided with a four-way proportional directional control (PDC) valve. Each PDC valve has a first position of adjustment in which it connects a first working chamber of its drive unit (26) to pressure (B) and a second working chamber to tank (T), and a second position of adjustment in which it connects the second working chamber to pressure (P) and the first working chamber to tank (T). Control logic (96) provides electrical control signals for directing the PDC valves to operate the drive units to advance more than half of the slat sets simultaneously in a first, conveying direction, and to retract the remaining slat sets in the opposite direction at a higher rate of speed. A controller compares the control logic signals with feedback signals generated by a separate linear position sensor PS for each slat set. The controller compares the desired positions of the slat sets, as determined by the control logic (96), with the actual positions of the slat sets, as determined by the position sensors PS. The difference between the desired and actual positions of the slat sets is used to generate a corrected control signal which the controller sends to proportional amplifiers (PA). The proportional amplifiers (PA) provide control signals to the PDC valves, for changing the rate of hydraulic fluid movement into and out from the working chambers of the drive units (26) for the advancing conveyor slat sets, towards establishing the desired pattern of movement of the slat sets. The conveyor includes a drive module comprising a pair of longitudinally spaced apart end frame members, each extending transversely of the conveyor, and a center frame member positioned longitudinally between the two end frame members, and also extending transversely of the conveyor.

22 Claims, 21 Drawing Sheets

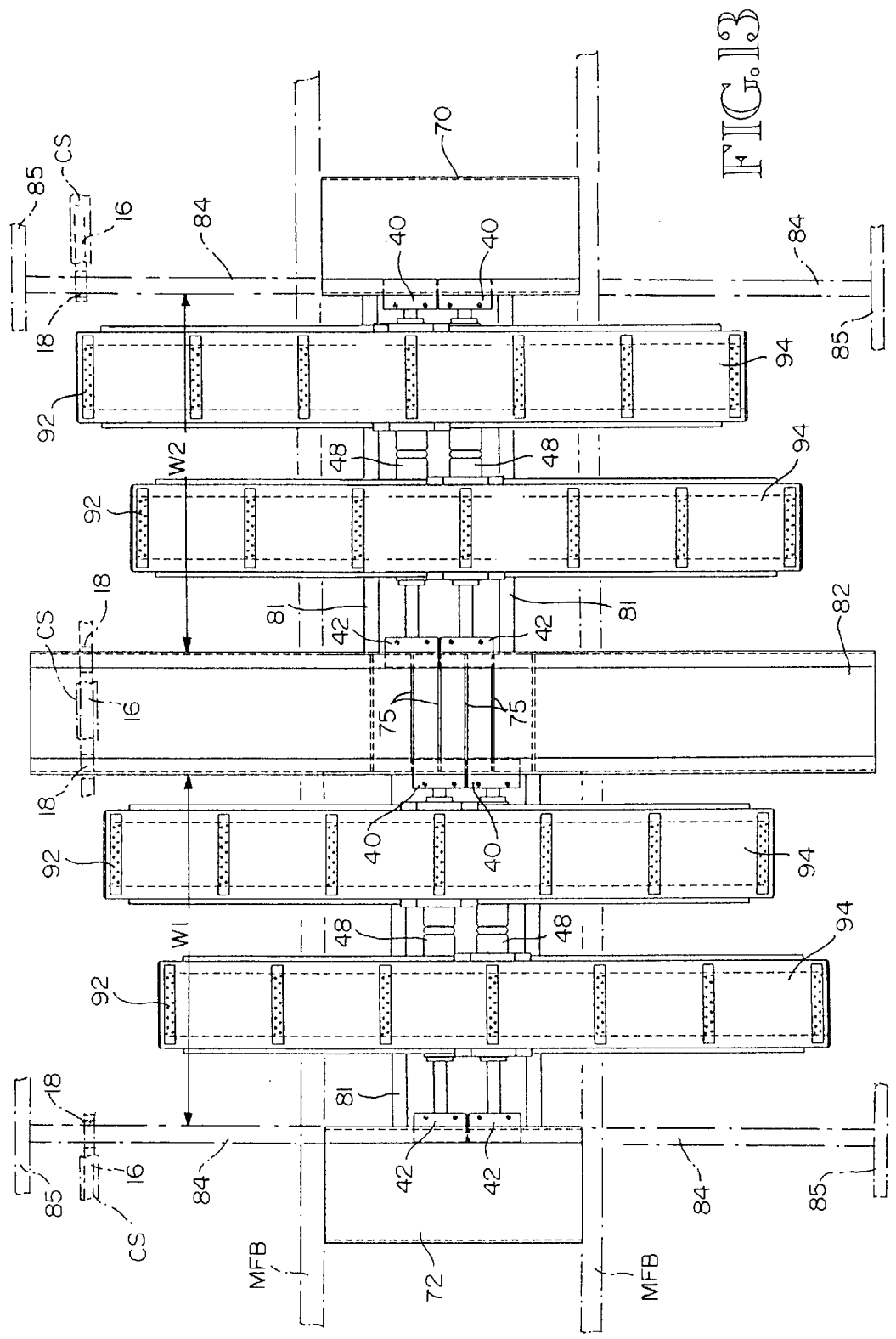

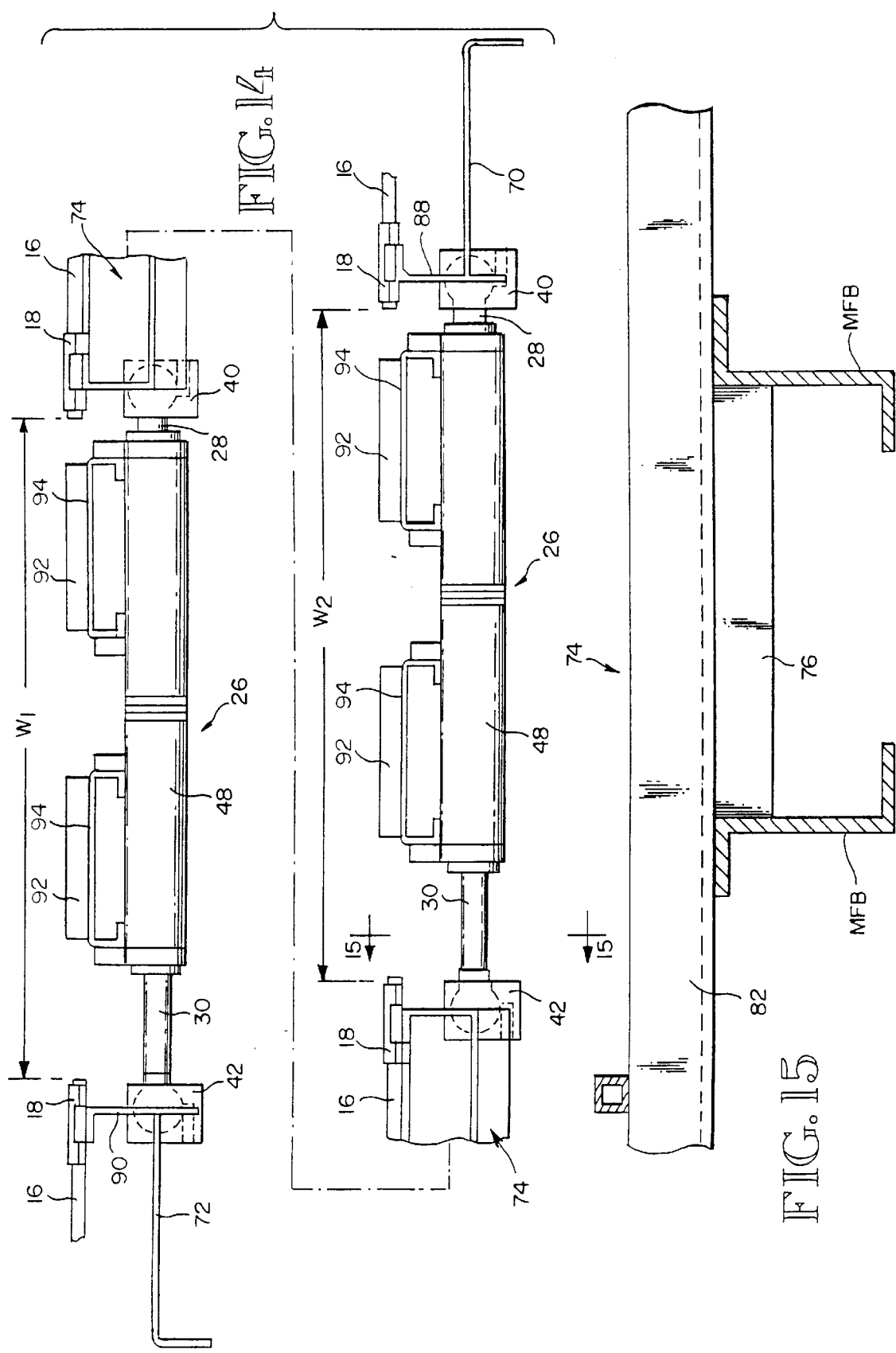

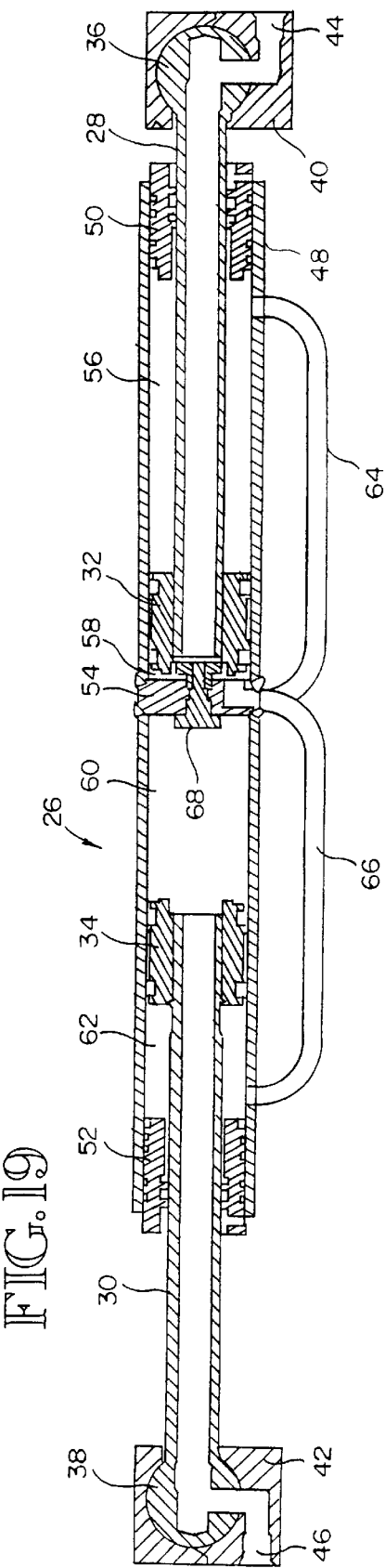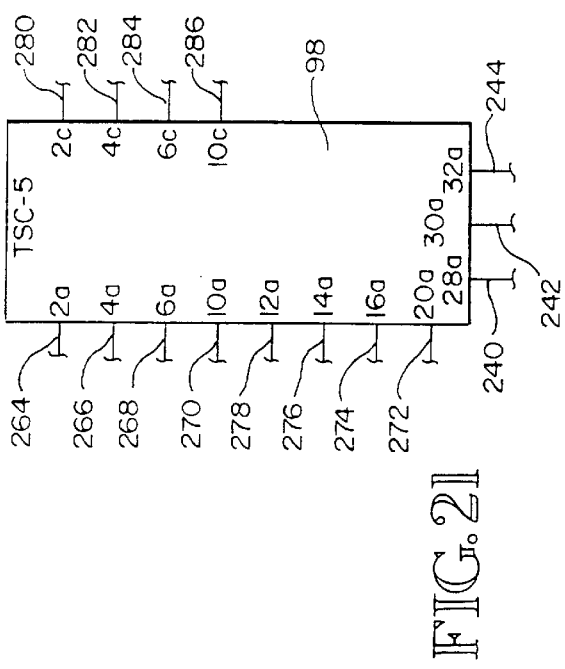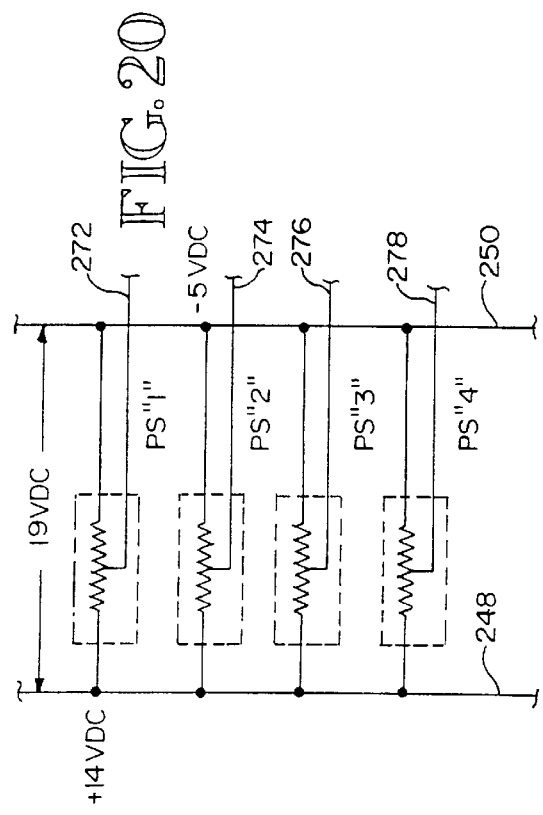

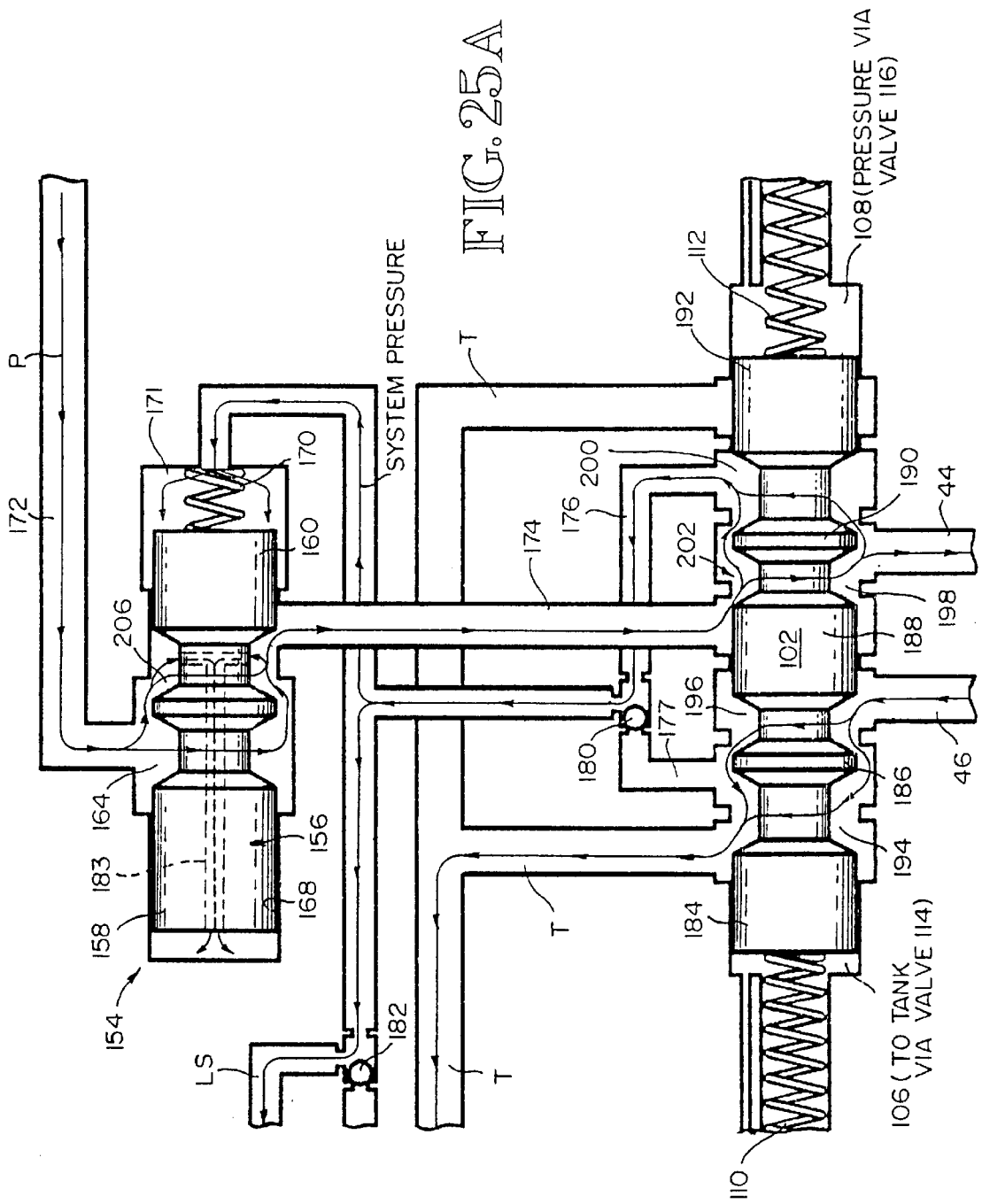

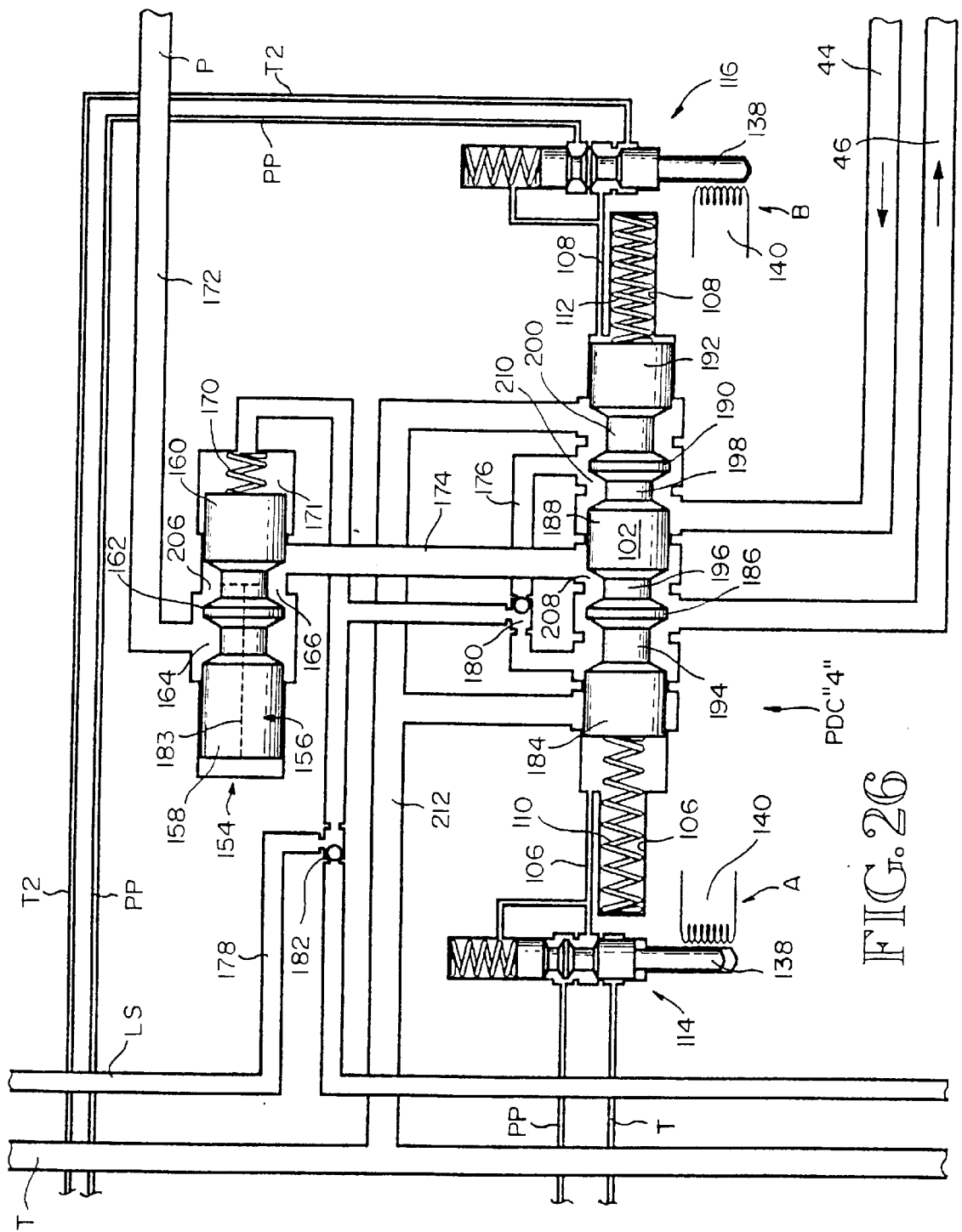

CONTINUOUSLY ADVANCING RECIPROCATING SLAT CONVEYOR

CROSS-REFERENCE TO RELATED APPLICATION

This application claims the benefit of Provisional application Ser. No. 60/015,235, filed Apr. 10, 1996, and entitled "Reciprocating Floor Conveyor With Continuous Drive System."

TECHNICAL FIELD

The present invention relates to continuously advancing, reciprocating slat conveyors. More particularly, it relates to hydraulic drive and control systems for such conveyors which use slat position feedback for adjusting the rate of slat movement towards maintaining a desired pattern of slat movement, and to a drive module for such conveyors.

BACKGROUND OF THE INVENTION

Reciprocating slat conveyors comprise a plurality of side by side conveyor slats that are driven in one direction for advancing a load and are retracted in the opposite direction. A reciprocating slat conveyor is divided into both "sets" and "groups" of conveyor slats. The slats of each "set" move together. Each "group" includes one slat from each "set." In some slat conveyors, all slats are driven in unison, in the conveying direction, and are then retracted sequentially, one set at a time. There have been attempts to drive a majority of the conveyor slat sets in the conveying direction while simultaneously retracting the remaining conveyor slat sets, to provide a conveyor that will continuously move the load on the conveyor. These conveyors are herein referred to as continuously advancing, reciprocating slat conveyors. Examples of continuously advancing, reciprocating slat conveyors, existing in the patent literature, are disclosed by the following patents: Netherlands Patent No. 67/06657, granted Nov. 13, 1968, to Cornelis Deyer; U.S. Pat. No. 3,534,875, granted Oct. 20, 1970, to Olof A. Hallstrom; U.S. Pat No. 4,144,963, granted Mar. 20, 1979, to Olof A. Hallstrom; U.S. Pat. No. 4,580,678, granted Apr. 8, 1986, to Raymond K. Foster; U.S. Pat. No. 4,793,468, granted Dec. 27, 1988, to James M. Hamilton and Phillip J. Sweet; U.S. Pat. No. 5,063,981, granted Nov. 12, 1991, to Arvo Jonkka; U.S. Pat. No. 5,340,264, granted Aug. 23, 1994, to Manfred W. Quaeck and U.S. Pat. No. 5,469,603, granted Nov. 28, 1995, to Jimmy R. Stover. These patents should be carefully considered for the purpose of putting the present invention into proper perspective relative to the prior art.

Hamilton et al. U.S. Pat. No. 4,793,468; Quaeck U.S. Pat. No. 5,340,264; and Stover U.S. Pat. No. 5,469,603 all utilize a control system that includes solenoid operated valves. Hamilton et al. U.S. Pat. No. 4,793,468 and Quaeck U.S. Pat. No. 5,340,264 use a regenerative circuit wherein common ends of the drive units are commonly plumbed so that the hydraulic fluid from all of the advancing cylinders is forced into the retracting cylinder, to cause the retraction. In these systems, each drive unit is provided with a switching valve that is connected to the working chamber of its drive unit that is opposite the working chamber that is connected to the other drive units. The switching valve switches its working chamber between pressure and return.

Stover U.S. Pat. No. 5,469,603 discloses providing each drive unit with two valves in series. One of these valves is a reversing valve. The other is a proportional valve having a tapered metering passageway and a movable tapered flow restricter that is connected to and moved by an electromagnetic operator. The reverse valve is operated by a micro switch that is tripped when the slats reach the end of their path of travel.

There is a need for a hydraulic drive and control system for a continuously advancing, reciprocating slat conveyor that utilizes pressure and return lines, piston-cylinder drive units for moving the slat sets, a proportional directional control (PDC) valve for each drive unit that switches the working chambers of the drive units between pressure and return, and a control system for the PDC valves that uses slat position feedback for adjusting the rate of fluid movement into and out from the working chambers for maintaining a desired pattern of slat movement. An object of the present invention is to provide such a hydraulic drive and control system. There is also a need for a drive module for a continuously advancing, reciprocating slat conveyor. Another object of the invention is to provide such a drive module.

DISCLOSURE OF THE INVENTION

The reciprocating slat conveyor of the present invention comprises at least three slat sets of at least one slat each. There is a piston-cylinder drive unit for each slat set, each including a stationary component and a movable component. The stationary and movable components together define first and second variable volume working chambers on opposite sides of a piston head. Each movable component is connected to its slat set. Each drive unit has a first inlet/outlet port for the first working chamber and a second inlet/outlet port for the second working chamber. The conveyor further comprises a pressure conduit connected to a source of hydraulic fluid pressure and a return conduit connected to tank. There is a four-way proportional directional control (PDC) valve for each drive unit. Each PDC valve has a first port connected to the pressure conduit, a second port connected to the return conduit, a third port connected to the first inlet/outlet port of its drive unit, and a fourth port connected to the second inlet/outlet port of its drive unit. Each PDC valve has a first position of adjustment in which it connects the first working chamber of its drive unit to pressure and the second working chamber to tank. It has a second position of adjustment in which it connects the second working chamber of its drive unit to pressure and the first working chamber to tank.

Each PDC valve includes an electrical signal responsive valve positioning means. There is a separate proportional amplifier for each PDC valve. Each proportional amplifier is connected to the valve positioning means of its PDC valve. There is a separate linear position sensor for each drive unit. Each linear position sensor is connected to the movable component of its drive unit. Each linear position sensor is operable to provide an electrical control signal indicative of the position of the movable component of its drive unit and the slat set connected to it. A control logic provides electrical control signals for directing the PDC valves to operate the drive units to advance more than half of the slats simultaneously in a first, conveying direction, and to retract the remaining slat sets in the opposite direction at a higher rate of speed. A controller is provided which is connected to the control logic, to the linear position sensors and to the proportional amplifiers. The controller is responsive to actual position signals received from the linear position sensors to modify electrical control signals received from the control logic. A corrective control signal is formed and sent to the proportional amplifiers. The proportional amplifiers prepare and send control signals to the valve positioning means, for adjusting the PDC valves. These valves control the direction and rate of hydraulic fluid movement into and out from the working chambers of the drive units for the advancing conveyor slat sets, towards maintaining a desired pattern of movement of the slat sets.

According to the invention, each PDC valve has a main valve spool that is moved in response to electrical signals received from the proportional amplifier associated with such valve. The movement of the main valve spool opens a first passageway in the PDC valve to allow hydraulic fluid to move from the pressure conduit through the PDC valve into one of the working chambers. It also opens a second passageway in the valve to allow hydraulic fluid to move out from the other working chamber of the drive unit through the PDC valve and into the return conduit connected to tank.

In preferred form, the electrical signal responsive valve positioning means comprises a pilot chamber at each end of the main valve spool and a pilot valve associated with each pilot chamber. Each pilot valve includes a solenoid for opening the pilot valve. The solenoids are controlled by electrical signals received from the associated proportional amplifier. Preferably also, the PDC valve includes two compression springs, one in each pilot chamber for the main valve spool. The compression springs contact the opposite ends of the main valve spool and function to substantially center the main valve spool when fluid pressure in the two pilot chambers is substantially balanced.

According to an aspect of the invention, each pilot valve includes a pilot valve spool, a pilot chamber at one end of the pilot valve spool, and a solenoid at the opposite end of the pilot valve spool. There is a compression spring in the pilot chamber that acts on the adjacent end of its pilot valve spool. This spring normally biases the pilot valve spool into a first position. The solenoid functions to move the pilot valve spool in the opposite direction, against the force of the spring. The amount of movement is determined by electrical signals sent to the solenoid. The solenoid valve connects the pilot chamber at its end of the main spool valve to return when the pilot valve is in the first position. It communicates pressure to the pilot chamber at its end of the main valve spool in response to the solenoid causing movement of the pilot valve spool against the pilot valve spring. Preferably, a signal sent by an associated proportional amplifier to the solenoids for the two pilot valves will shift the pilot valve spools in directions allowing pressure to be communicated through one pilot valve to the pilot chamber at its end of the main valve spool, while communicating the second pilot chamber at the second end of the main valve spool with return, via the second pilot valve. A signal sent by the proportional amplifier to the pilot valves, for commanding the PDC valve to retract its set of conveyor slats, will cause the two solenoid valves to move the main valve spool into a position in which the first and second passageways through the PDC valve are of sufficient size to cause the drive unit to retract the slat set at a substantially faster speed than the advanced speed of the slat set.

In preferred form, each piston-cylinder drive unit has stationary opposite end portions and a movable central portion. The transverse drive beam is connected to each movable central portion. Each drive beam is connected to a separate one of the slat sets. The variable volume working chambers are formed by and between the stationary end portions and movable central portions of the drive units. The first inlet/outlet port is at a first end of the drive unit. The second inlet/outlet port is at a second end of the drive unit.

According to another aspect of the invention, the drive module is provided which comprises a pair of longitudinally spaced apart end frame members, each extending transversely of the conveyor. The center frame member is positioned longitudinally between the two end frame members. It also extends transversely of the conveyor. A first pair of piston-cylinder drive units are provided to extend longitudinally of the conveyor, between a first said end frame member and said center frame member. These drive units each have a fixed end portion connected to the center frame member and a movable portion between the first end frame member and the center frame member. They also can have a second and opposite fixed end portion that is connected to the first end frame member. A second pair of piston-cylinder drive units are provided to extend longitudinally of the conveyor, between the center frame member and the second end frame member. These drive units each have a fixed end portion that is connected to the second end frame member and a movable portion that is located between the first end frame member and the center frame member. This pair of drive units may each also have a second fixed opposite end portion that is connected to the center frame member. Four transverse drive beams are provided, one for each drive unit. Two of the transverse drive beams are positioned between the first end frame member and the center frame member. The remaining two of the transverse drive beams are positioned between the center frame member and the second end frame member. Each transverse drive beam is connected to the movable portion of a separate related one of the drive units.

In the preferred embodiment, each drive unit has two fixed opposite end portions and a movable center portion. One of the fixed opposite end portions is connected to one of the end frame members. The other is connected to the center frame member.

According to an aspect of the invention, the center frame member includes an upper portion and a plurality of bearing supports connected to said upper portion. The bearing supports are beam members that extend longitudinally of the conveyor. In use, at least one bearing is connected to each bearing support. Each bearing support and bearing on it receive and support a portion of a reciprocating conveyor slat.

Preferably, the center frame member is in the nature of an upwardly opening channel. Strengthening members are provided within the channel. These members extend transversely of the channel and longitudinally of the conveyor. These strengthening members are provided where the drive units are connected to the center frame member. Preferably, the end frame members are of a length to fit substantially between a pair of longitudinally extending, laterally spaced apart center frame beams. The center frame member is adapted to set down on the center frame beams and to extend laterally outwardly from them, substantially to the side boundaries of the conveyor. The end frame members have upper portions which in use project above the center frame beams. Each upper portion has an upper surface. The center frame member has an upper surface at substantially the same level as the upper surfaces of the end frame members. Longitudinally extending support and guide beams for the conveyor slats are connected to the upper surfaces of the other end frame members and the upper surfaces of the center frame members. Windows are formed between ends of support and guide beams which are connected to each end frame member, and ends of support and guide beams which are connected to the center frame member. Each of these windows provide access to two of the drive beams. Within these windows, conveyor slat sets are connected to the drive beams, one slat set per drive beam.

These and other advantages, objects and features will become apparent from the following best mode description, the accompanying drawings, and the claims, which are all incorporated herein as part of the disclosure of the invention.

BRIEF DESCRIPTION OF THE DRAWINGS

In the drawings, like element designations refer to like parts throughout the several views, and:

FIG. 13 is a top plan view of the drive assembly;

FIG. 14 is a split side elevational view of the drive assembly shown in FIG. 13;

FIG. 15 is a fragmentary sectional view taken substantially along line 15—15 of FIG. 14, such view showing a pair of laterally spaced apart mainframe beams;

FIG. 19 is a longitudinal sectional view of a preferred embodiment of the piston-cylinder drive unit;

FIG. 20 is a ladder diagram of the four linear position transducers that are associated with the four drive units;

FIG. 21 is a diagram of a controller that receives signals from control logic and from the four linear position transducers;

FIG. 25A is an enlarged scale view of a central portion of FIG. 25.

FIG. 26 is a view like FIGS. 24 and 25 but showing the components of the valve in the positions that they occupy when the valve is in a "retracting" position;

FIG. 29 is a view like FIG. 29, but showing a graph of the commanded positions for all four slat sets;

BEST MODE FOR CARRYING OUT THE INVENTION

Figure 1:
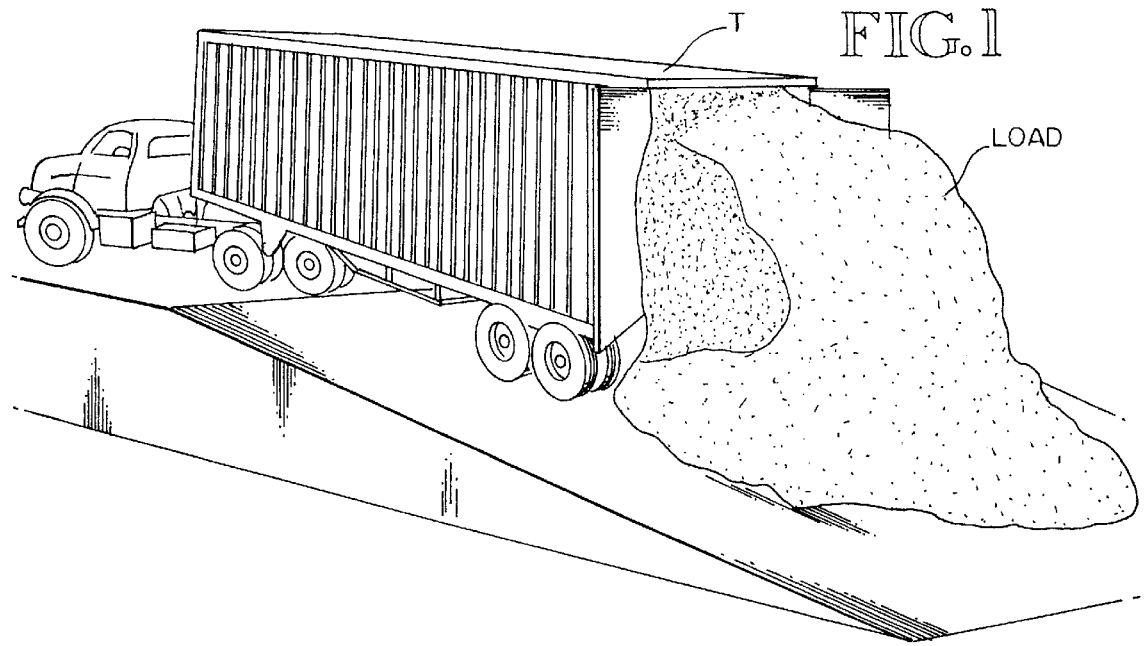
FIG. 1 is a pictorial view of a trailer that includes a reciprocating slat conveyor, shown in the process of using the conveyor to discharge its load.

FIG. 1 shows a load of bulk material being unloaded from a trailer T by use of a reciprocating slat conveyor within the trailer T. This is one use of the reciprocating slat conveyor of the present invention. Other uses are in stationary installations, e.g. as disclosed in U.S. Pat. No. 4,508,211, granted Apr. 2, 1985, to Raymond K. Foster, and in the aforementioned U.S. Pat. Nos. 5,340,264 and 5,469,603.

The conveyor must include at least three slat "sets." However, four slat "sets" are preferred. FIGS. 2–8 illustrate the desired pattern of conveyor slat movement in a four slat conveyor. These diagrams illustrate four slat sets, designated "1," "2," "3" and "4," and two "groups." The conveyor must include at least one "group" but the number of groups is a variable. Each "group" includes one slat from each "set." In other words, each group includes one set "1" slat, one set "2" slat, one set "3" slat, and one set "4" slat, in that order. A typical conveyor will include five groups (twenty slats) or six groups (twenty-four slats). The length and width of the slats are variables.

Figure 2:
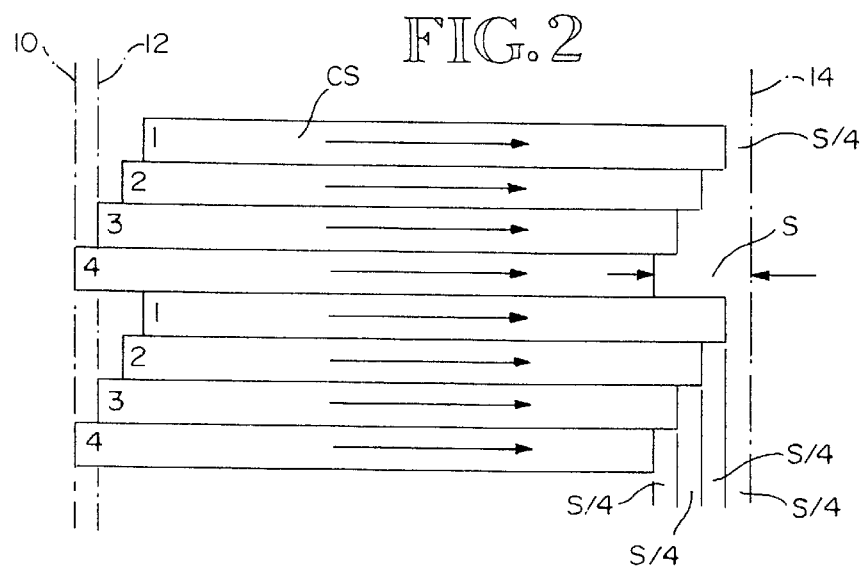
FIG. 2 is a top plan diagram of a conveyor which includes two groups and four sets of conveyor slats, such view showing the sets of slats staggered, and showing all of the slats moving together, away from a start position and towards an advanced position.
Figure 3:
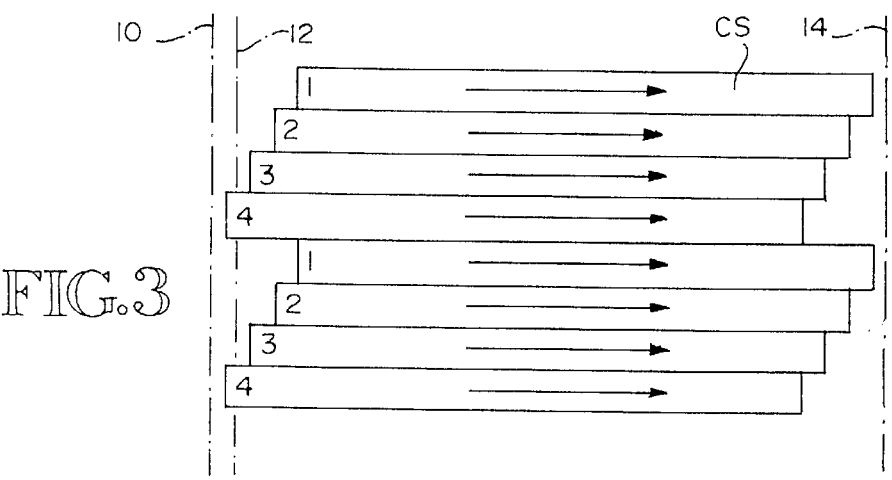
FIG. 3 is a view like FIG. 2, but showing the slats advanced in position a small amount from their positions in FIG. 2.

FIG. 2 shows the desired stagger pattern of the slats. The slats of slat set "4" are shown in a fully retracted position, back against retract line 10. The distances between the forward end of a slat set "4" slat and an advanced line 14 is equal to the stroke lengths. This stroke length S is shown to be divided into four parts S/4. At the rear of the pattern, a third line 12 is shown spaced forwardly from retract line 10 by the amount S/4. FIG. 2 shows all of the slats moving together towards the advanced position 14. In FIG. 2, the set "4" slats are just starting to move. FIG. 3 shows the slats moved forwardly from their position in FIG. 2 by a distance S/8. All of the slats are still moving together towards the advanced position 14. Movement of the slats from the retracted or start position 10 to the advanced position 14 is movement in the conveying direction. Movement in the opposite direction is a "return," "retracting" or "retract" movement.

Figure 4:
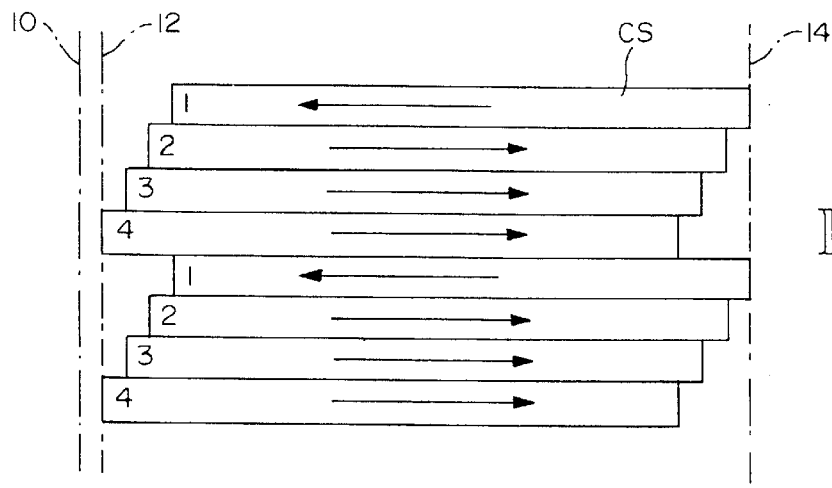
FIG. 4 is a view like FIGS. 2 and 3, but showing the set "1" slats at their advanced position and starting to retract towards their retracted position, and showing the remaining slat sets still advancing.
Figure 5:
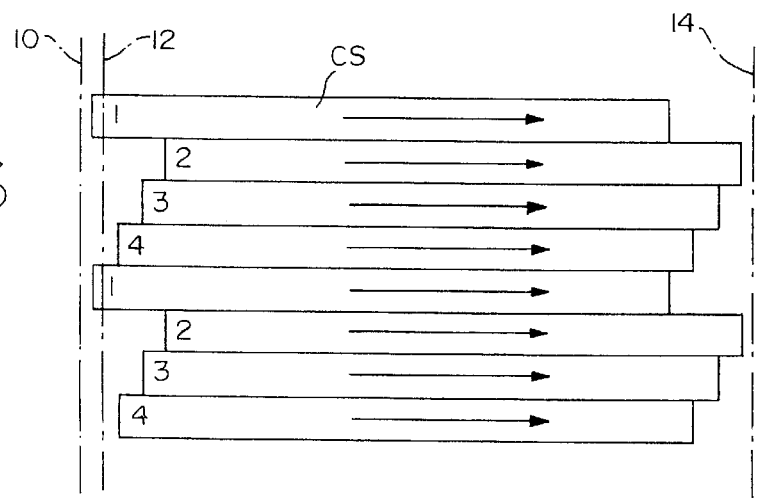
FIG. 5 is a view like FIGS. 2–4, but showing the set "1" slats after they have reached their retracted position and have again started advancing, and showing them advancing with the other slat sets.
Figure 6:
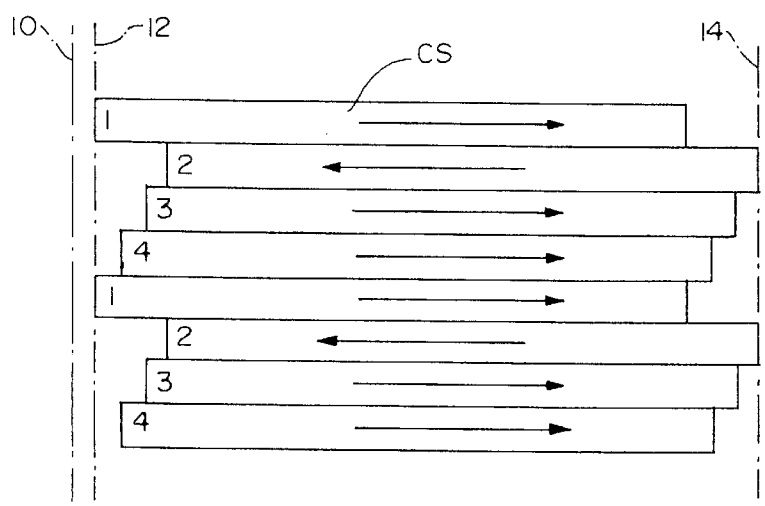
FIG. 6 is a view like FIGS. 2–5, but showing the set "2" slats at their advanced position and starting to retract, and showing the other slat sets still advancing.
Figure 7:
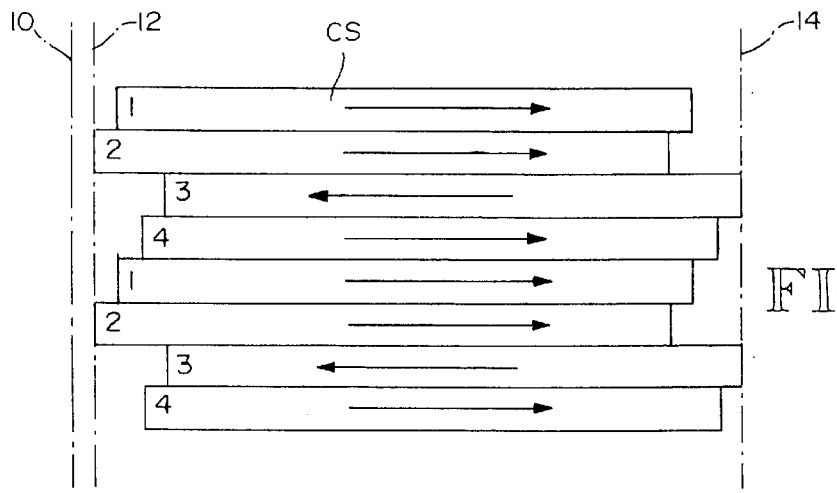
FIG. 7 is a view like FIGS. 2–6, but showing the set "3" slats at their advanced position and starting to retract, and showing the other slat sets still advancing.
Figure 8:
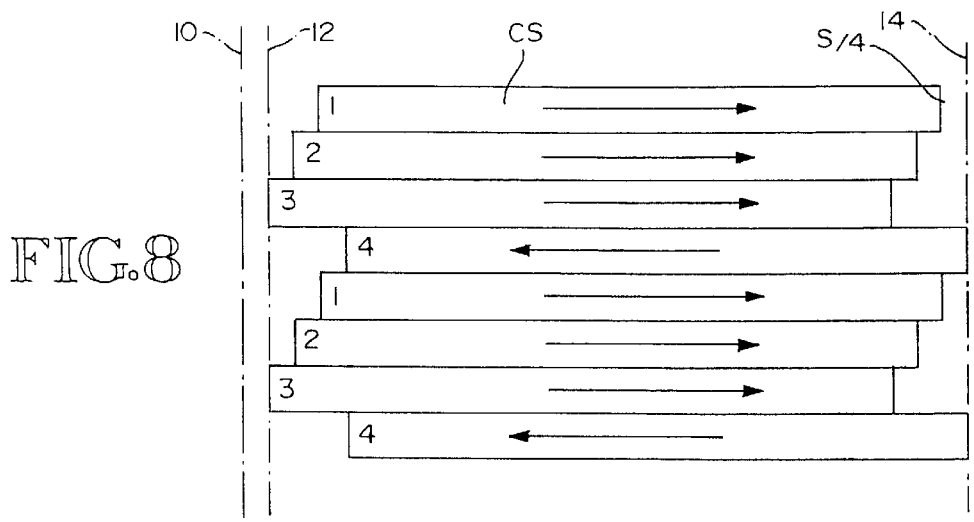
FIG. 8 is a view like FIGS. 2–7, but showing the set "4" slats at their advanced position and starting to retract, and showing the other slat sets still advancing.

FIG. 4 shows the positions of the slats when the set "1" slats have reached the advanced position 14 and have just started to return. At this time, the set "4" slats are the farthest to the rear and their rear ends are at line 12. FIG. 5 shows the slats moved forward from their FIG. 4 positions an amount equal to S/8. At this time, all of the slats are moving together towards the advanced position 14. FIG. 6 shows the set "2" slats at the advanced position and just starting to return, while the remaining slats are advancing. FIG. 7 shows the set "3" slats at the advanced position 14 and just starting to return while the other slats are advancing. FIG. 8 shows the set "4" slats at the advanced position 14 and just starting to return while the other slats are advancing.

As can be seen from FIGS. 2–8, for a distance equal to approximately S/4, all of the slats are moving together in the conveying direction. As will be appreciated, the stagger distances will not and cannot always be exactly S/4. As will hereinafter be explained, the retracting slats move much faster than the advancing slats but it still takes some time for them to retract. As they retract, there is some forward movement of the advancing slats. FIG. 8 shows the forward end of the set "1" slats spaced about S/4 from advanced line 14 at the start of retraction of the set "4" slats. FIG. 2 shows about the same spacing S/4 at the forward ends of the set "1" slats when the set "4" slats are back against the retract line 10. However, the actual spacing at the forward ends of the set "1" slats must be and is larger in the FIG. 8 position than it is in the FIG. 2 position.

Figure 9:
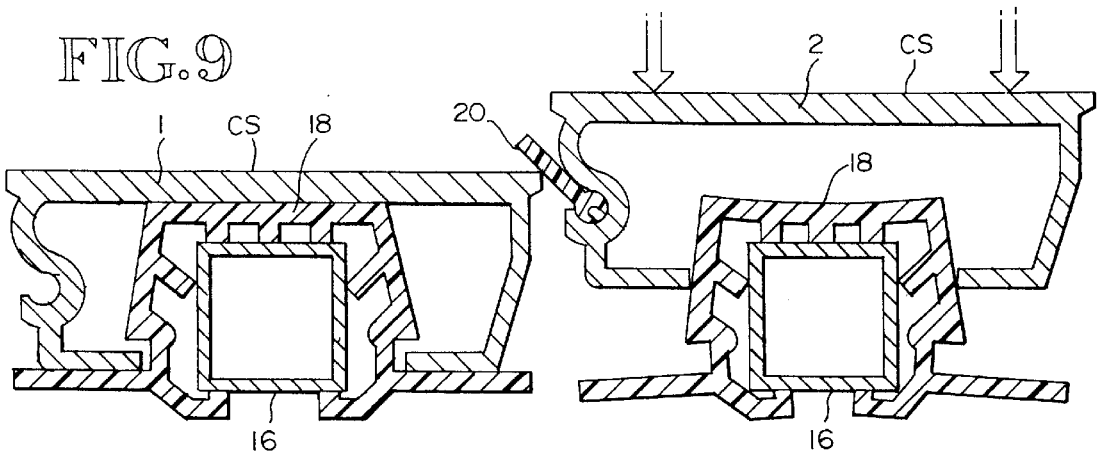
FIG. 9 is a cross-sectional view showing a pair of adjacent conveyor slats, their support beams and bearings, with one of the slats in the process of being moved downwardly into position adjacent the other slat.

As is known in the art, the slats are mounted for reciprocation by longitudinal support and guide beams 16 and by plastic bearings 18 that are spaced apart along the beams 16. It is customary to provide a seal member 20 that is carried by one of the slats which makes sealing contact with the adjacent side surface of the adjoining slat. FIG. 9 shows seal member 20 carried by slat 2 and in sliding sealing contact with slat 1. FIG. 9 also shows a bearing 18 positioned on a guide beam 16 and a slat 1 positioned on the bearing 18. It also shows a second bearing 18 positioned on a guide beam 16 and a slat 2 in the process of being snap-fitted down onto the bearing 18. The construction and arrangement of the guide beams 16, the bearings 18 and the conveyor slats are disclosed by U.S. Pat. No. 4,858,748, granted Aug. 22, 1989, to Raymond K. Foster, and also by U.S. Pat. No. 4,896,761, granted Jan. 30, 1990, also to Raymond K. Foster.

FIGS. 10–15 show a preferred drive assembly 22 that is basically characterized by a drive assembly frame 24 and a plurality of piston-cylinder drive units 26, one for each slat set. In preferred form, the drive units 26 each comprises a pair of opposite end portions that are both mounted to the frame 24 and a movable central portion which reciprocates back and forth along the stationary portions. The stationary portions may be cylinder components and the movable central portion may be a piston component, such as disclosed in the Raymond Keith Foster U.S. Pat. No. 5,638,943, granted Jun. 17, 1997, and entitled Drive Assembly For Reciprocating Slat Conveyor. In preferred form, the stationary portions are piston components including hollow piston rods 28, 30 having piston heads 32, 34 at their inner ends. The outer ends of the piston rods 28, 30 include ball mounts 36, 38 which are received within ball blocks 40, 42. Each ball block 40 includes an inlet/outlet port 44 and each ball block 42 includes an inlet/outlet port 46 (FIG. 19).

Referring to FIG. 19, the movable central portion of the preferred drive unit 26 includes an elongated cylinder barrel 48 having cylinder heads 50, 52 at its opposite ends, and a divider wall 54 at its center. The drive unit 26 is divided into four working chambers. Working chamber 56 is defined axially between piston head 32 and cylinder head 50. Working chamber 58 is defined axially between piston head 32 and divider wall 54. Working chamber 60 is defined axially between piston head 34 and divider wall 54. Working chamber 62 is defined axially between piston head 34 and cylinder head 52. A first tube 64 interconnects working chambers 56, 60. A second tube 66 interconnects working chambers 58, 62. As can be seen from FIG. 19, the drive units are balanced. That is, the hydraulic fluid acts on the same amount of area in both directions. Herein, the statement that the stationary and movable components of the drive units define first and second working chambers on opposite sides of a piston head is intended to describe any type of double acting hydraulic drive unit. This includes the drive units disclosed in the aforementioned U.S. Pat. Nos. 4,580,678 and 5,373,777, the aforementioned U.S. Pat. No. 5,638,943 and in U.S. Pat. No. 4,793,469, granted Dec. 27, 1988, to Raymond Keith Foster.

When port 44 is connected to pressure and port 46 is connected to return, hydraulic fluid enters working chambers 58, 62 and exits working chambers 56, 60, causing movement of cylinder barrel 48. Herein, this movement is referred to as the "advancing" movement. When port 46 is connected to pressure and port 44 is connected to return, hydraulic fluid enters working chambers 60, 56 and exits working chambers 58, 62, causing movement of cylinder barrel 48 in the opposite direction. Herein, this is referred to as the "retracting" direction. The drive units 26 are disclosed in greater detail in U.S. Pat. No. 4,748,894, granted Jun. 7, 1988, to Raymond Keith Foster, and in U.S. Pat. No. 5,373,777, granted Dec. 20, 1994, also to Raymond K. Foster. Preferably, the drive units 26 include a snubber 68 such as disclosed in U.S. Pat. No. 5,373,777. The ball block mounts 36, 40 and 38, 42 are disclosed in detail in U.S. Pat. No. 5,350,054, granted Sep. 27, 1994, to Raymond K. Foster, and in U.S. Pat. No. 5,390,781, granted Feb. 21, 1995, also to Raymond K. Foster.

Referring to FIGS. 10–14, the drive module frame 24 comprises a pair of end frame members 70, 72 and a center frame member 74. The end members 70, 72 may be of a length to fit between a pair of laterally spaced apart main frame beams MFB (FIGS. 13 and 15). The center member 74 may include a lower portion 76 that includes lateral members 78, 80 that are substantially equal in length to the end members 70, 72. These lateral members 78, 80 also fit laterally between the main frame beams MFB. Member 74 includes an upper portion 82 that may extend substantially the full width of the conveyor frame. Upper portion 82 is in the form of a lipped channel 82. Longitudinal frame members 81 extend between the end frame members 70, 72 and the center frame member 74.

Figure 11:
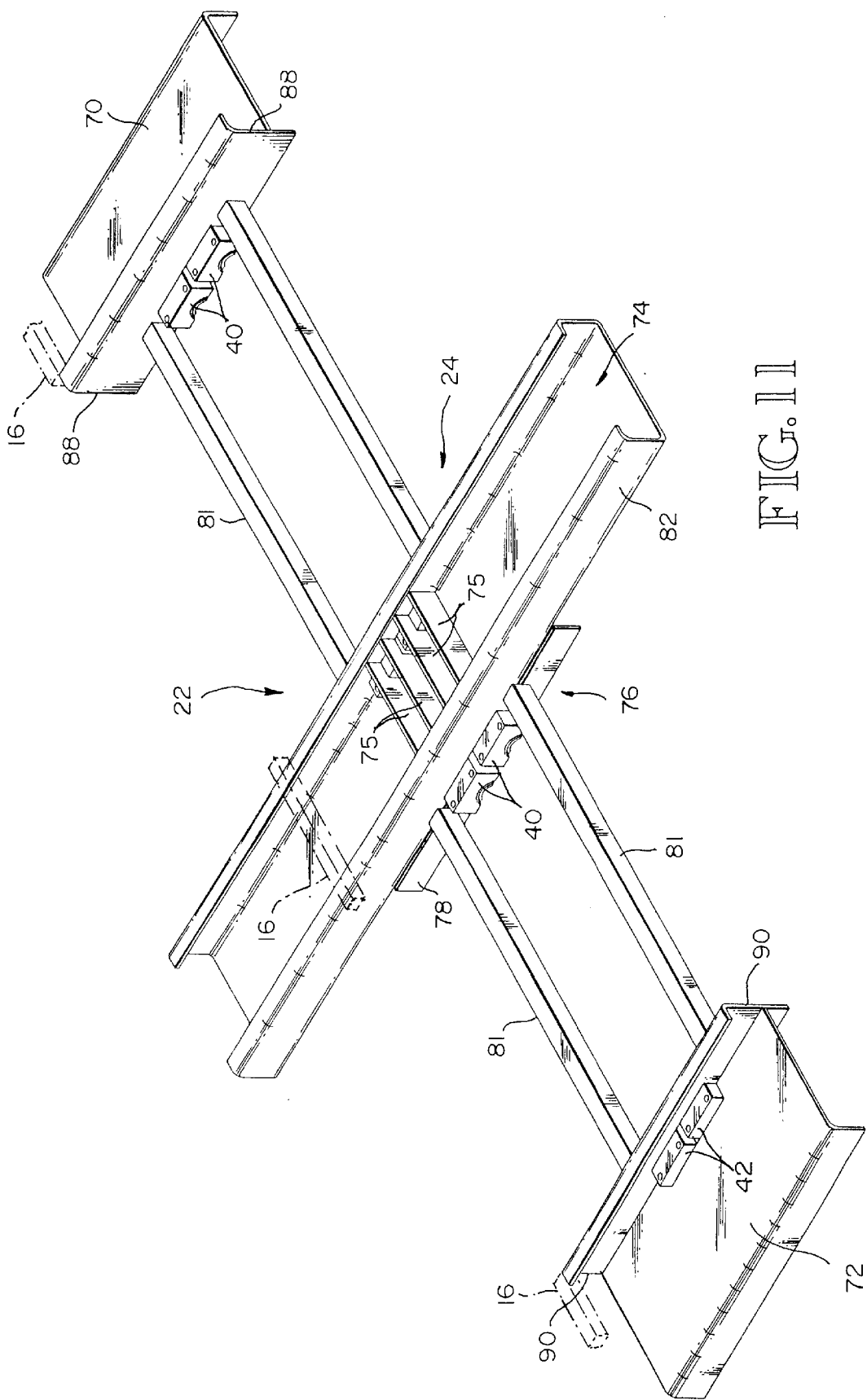
FIG. 11 is an enlarged scale view of a preferred embodiment of the conveyor frame, such view being taken from above and looking towards one end and one side of the conveyor frame.
Figure 12:
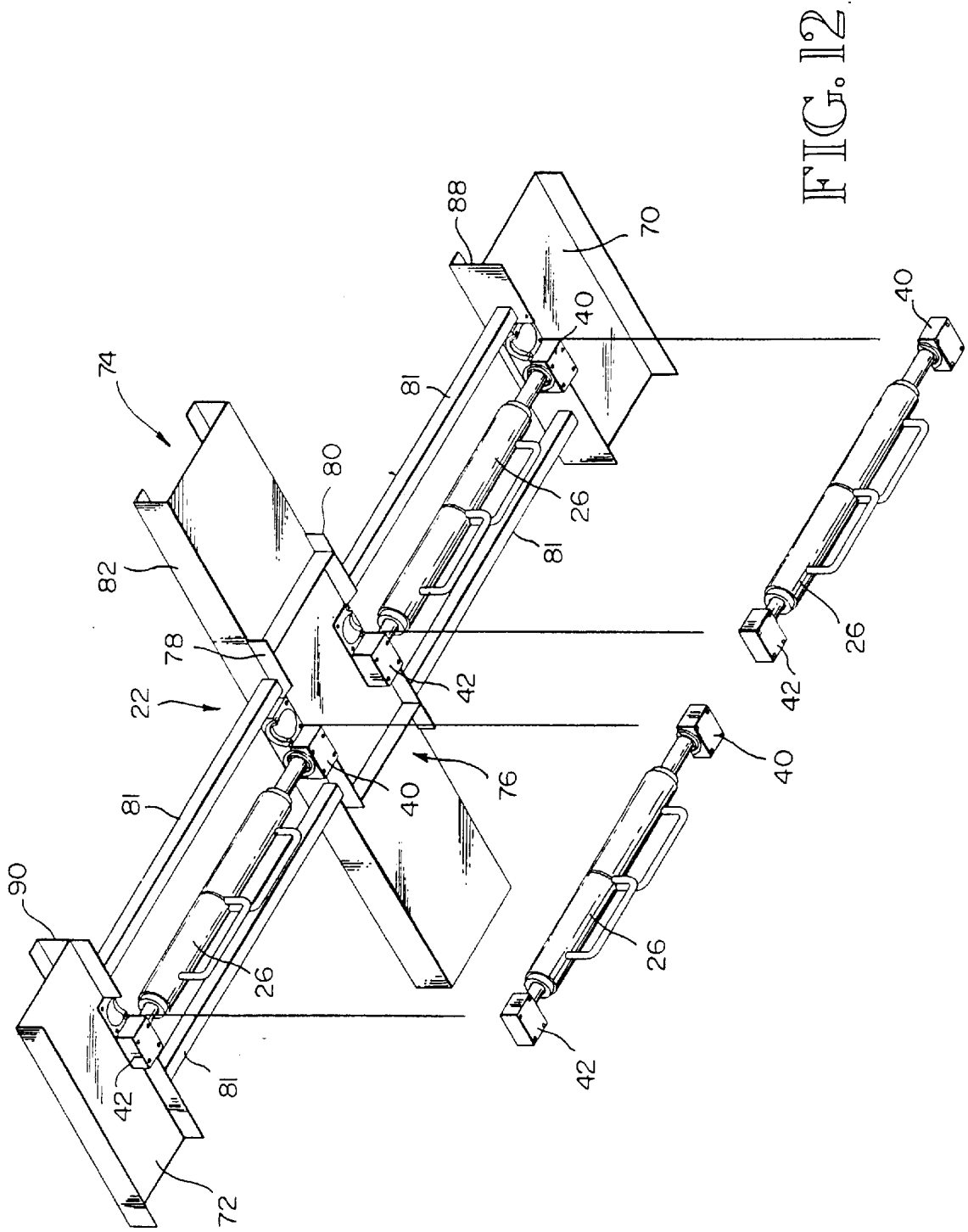
FIG. 12 is a pictorial view looking upwardly towards the bottom of a preferred embodiment of a drive assembly, minus the transverse drive beams, such view showing two drive units mounted and two drive units in a spaced relationship from their mounted positions.

The main frame beams MFB are shown in broken lines in FIG. 13. Also, cross-sill members 84 are shown in broken lines. The end frame members 70, 72 include portions 88, 90 which project upwardly above the main frame beams MFB a distance substantially equal to the height of the cross-sill members 84. The cross-sill members 84 set down on top of and are connected to the main frame beams MFB. They also set down on and are connected to the tops of side frame members 85. At their inner ends, the cross-sill members 84 may be butt welded to the end member portions 88, 90. In FIGS. 11 and 13, fragments of a support and guide beam 16 are shown in broken line. In FIG. 13, four of the bearings 18 are shown positioned on the guide beam sections 16. There is also a fragmentary broken line showing of a conveyor slat CS riding on the bearings 18. Conveyor slat CS is connected to a connector 92 that is connected to a transverse drive beam 94, also sometimes referred to as a cross drive 94. As is known in the art, a separate cross drive 94 is connected to each drive unit 26. This is usually done by use of clamps, as disclosed in U.S. Pat. No. 4,793,469, granted Dec. 27, 1988, to Raymond K. Foster. Each cross drive 94 is connected to one set of the conveyor slats CS by use of the connectors 92. This is well disclosed in the aforementioned U.S. Pat. No. 4,748,894, for example. The fixed portions of the ball blocks 40, 42 are integrated into the end frame members 70, 72 in the manner disclosed by the aforementioned U.S. Pat. No. 5,390,781, for example. The fixed portions of the inner ball blocks 40, 42 are integrated into the center frame member 74 in substantially the same way. Center frame member 74 is preferably generally in the shape of an upwardly opening channel, as shown in FIG. 11. It is provided with internal reinforcement plates 75. These plates 75 are vertically disposed and they extend transversely of the frame member 74, and longitudinally of the conveyor. Their ends are connected to sidewall portions of the lip channel 82, generally at the ends of the strengthening plates 75.

As shown by FIG. 14, windows in the conveyor main frame W1, W2 are formed on opposite sides of the transverse frame member 74. Owing to the construction of the drive assembly frame, the windows W1, W2 are relatively short. Two transverse drive beams 94 reciprocate back and forth in each window W1, W2. The end members 70, 72, the cross-sills 84 and the guide beams 16 provide reinforcement at the outer ends of the windows W1, W2. The transverse beam 74 and its guide beam segments 16 provide reinforcement at the inner ends of the windows W1, W2. Within the windows W1, W2, the loads imposed on the conveyor slats are picked up by the drive units 26 and transmitted to the frame members 70, 72, 74, and from such frame members to the main frame beams MFB. The drive units 26 are in the nature of structural beams capable of carrying bending moments, more specifically, the downward forces imposed on the conveyor slats CS are transmitted by the conveyor slats CS to the transverse drive beams 94, and from the drive beams 94 to the movable center portions of the drive units 26. They are then transmitted by the movable center portions of the drive units 26 to the end portions of the drive units 26 and from such end portions to the frame members 70, 72, 74. FIG. 13 shows a particular pattern of the transverse drive beams 94 connected to the cylinder barrels 48 of the drive units 26. However, it is to be understood that this pattern can change. Any one of the beams 94 can be clamped to any one of the drive units 26. The resulting stagger will determine the order of operation of the drive units. In FIG. 13, the pattern of the beams 94 on the drive units 26 results in the far right beam 94 and the top drive unit 26 on the right being connected to the set "1" slats. The beam 94 that is second from the left and the upper drive unit 26 on the left are connected to the set "2" slats. The beam 94 second from the right and the lower drive unit 26 on the right are connected to the set "3" slats. The beam 94 on the left and the lower drive unit 26 on the left are connected to the set "4" slats.

Figure 16:
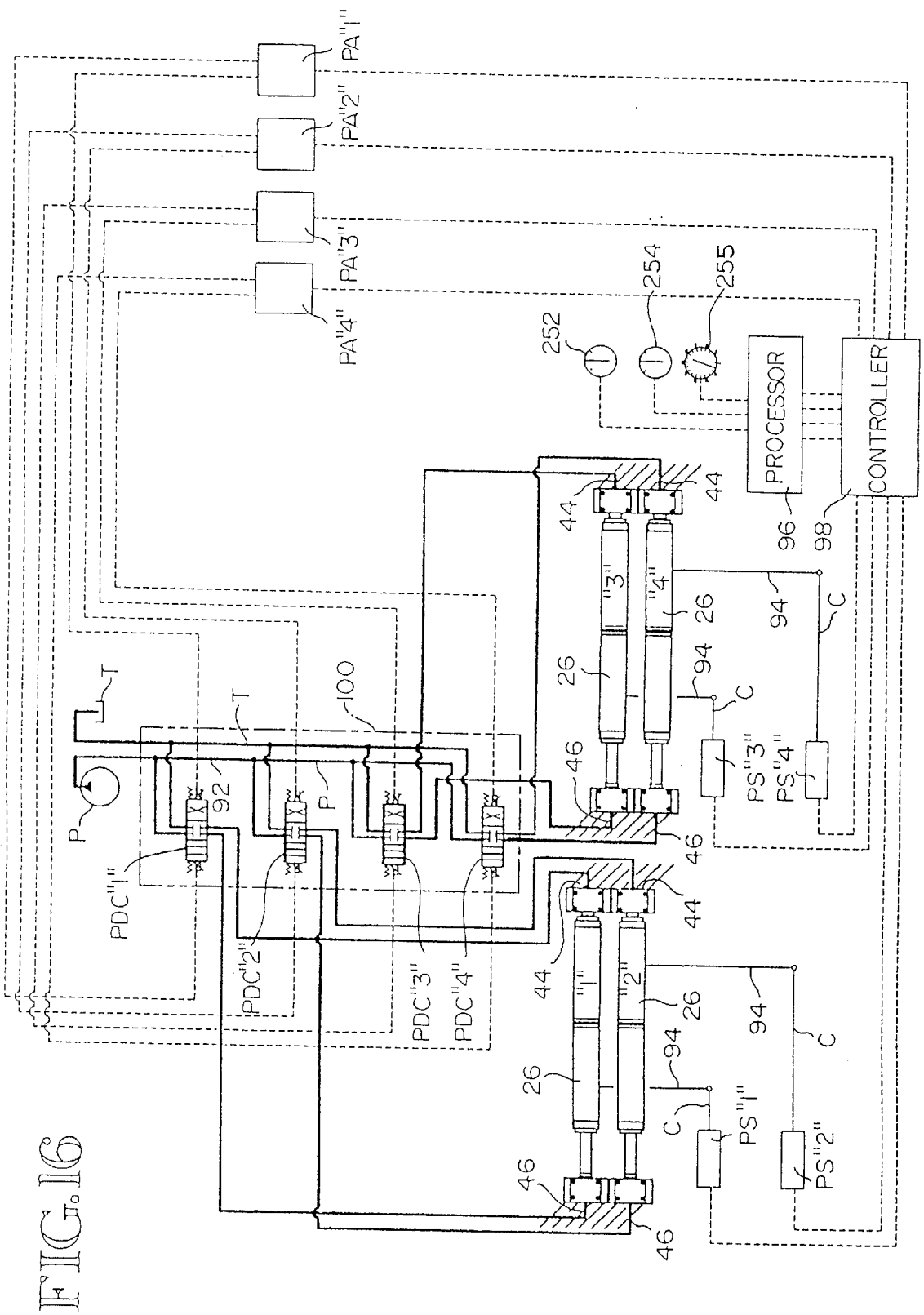
FIG. 16 is a schematic diagram of a hydraulic drive and control system for the preferred embodiment of the invention.

FIG. 16 is a system diagram. In this diagram, the drive cylinders 26 on the left are in the same position relative to the drive units 26 on the right as they are in FIG. 13. For the purposes of this discussion, the drive units 26 have been numbered "1," "2," "3," "4" to indicate the slat set to which each is connected. In the system, the appropriate stagger of the beams 94 would have to be made. Specifically, the beam 94 shown on the right in FIG. 13 would have to be connected to the set "1" drive unit 26. The drive beam 94 that is second from the left in FIG. 13 would have to be connected to the set "2" drive unit 26. The beam 94 that is second from the right in FIG. 13 would have to be connected to the set "3" drive unit 26. The beam 94 shown on the left in FIG. 33 would have to be connected to the set "4" drive unit 26.

The control system of the present invention is relatively simple. A pump P feeds to one end of a pressure conduit P. A tank T is at one end of a return conduit T. There are four proportional directional control (PDC) valves PDC "1," PDC "2," PDC "3," PDC "4," one for each slat set. The numbers "1," "2," "3," "4" represent the slat sets and the drive units 26 for the slat sets. The PDC valves switch pressure and return back and forth between the ports 44, 46 at the opposite ends of the drive units 26 via conduits shown in FIG. 16. They also control the flow rate of the hydraulic fluid or oil as will hereinafter be described in greater detail. By way of example, the PDC valves may each be a MP-18 Directional Control Valve available from The Rexroth Corporation, 2315 City Line Road, Bethlehem, Pa. 18017-2131. The catalog code for the four valve assemblies is 4MP18-10/C / LB0IL(24)22A / LB0IL(24)220A / LB0IL(24)220A / LB0IL(24)220A / Q. The catalog code for each valve section, i.e. each PDC valve, is LB0IL(24)ZZOA. Each PDC valve is a four port valve. The pump conduit P is connected to a first port. A return conduit T is connected to a second port. The third port is connected to drive unit inlet/outlet 44. The fourth port is connected to drive unit inlet/outlet 46.

Figure 10:
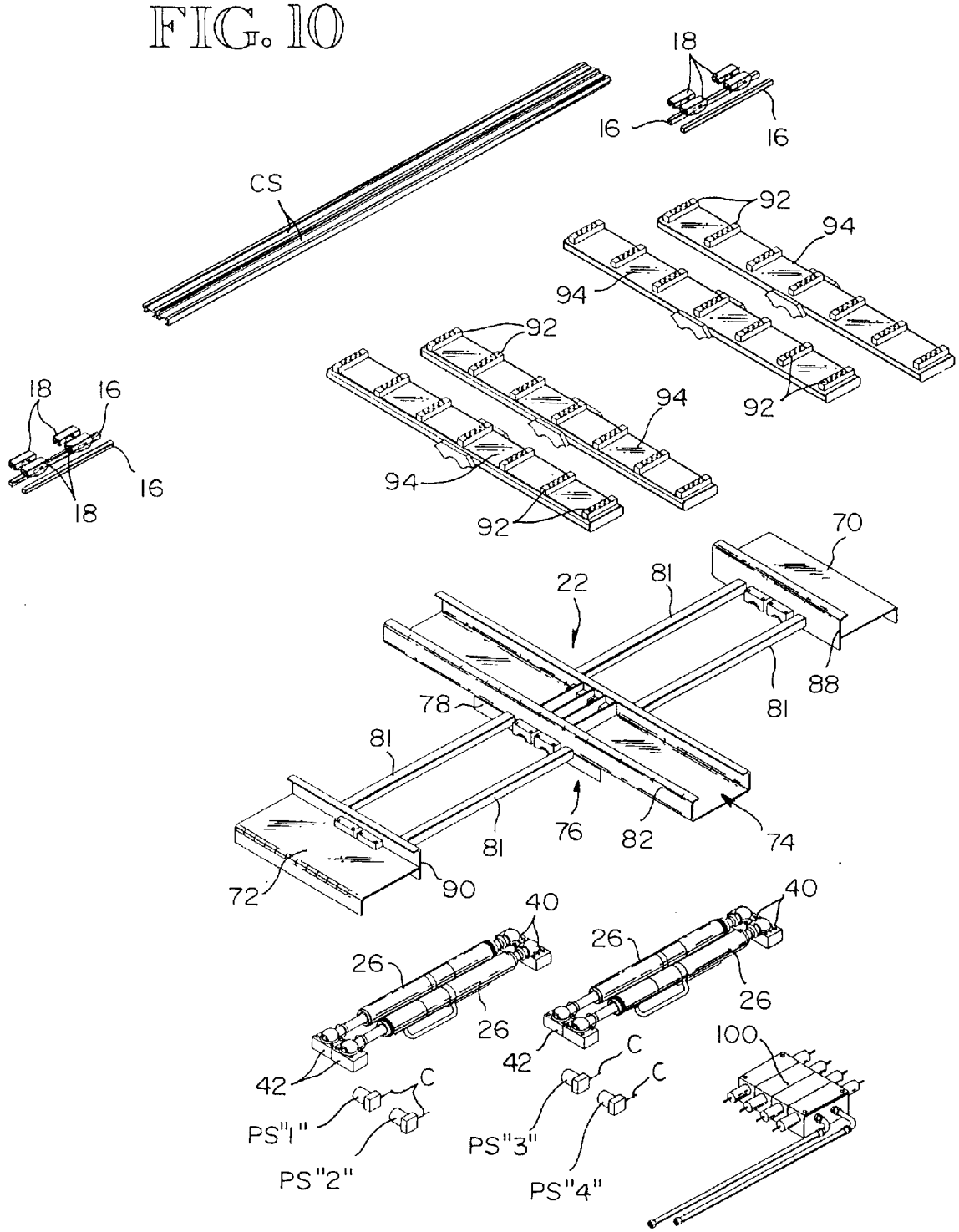
FIG. 10 is an exploded pictorial view of the drive components and some of the control components, such view showing the transverse drive beams, some conveyor slats, some conveyor slat support beams, and some bearings spaced above a conveyor frame, and showing the drive units, control valves for the drive units and position sensors spaced below the conveyor frame.

According to the invention, a position sensor is associated with each slat set. Sensor PS "1" is associated with slat set "1." Sensor PS "2" is associated with slat set "2." Sensor PS "3" is associated with slat set "3." Sensor PS "4" is associated with slat set "4." In the preferred embodiment, the position sensors PS "1," PS "2," PS "3," PS "4" are string transducers model No. HX-PA-10-NJC, manufactured by Uni-Measure, located in Corvallis, Oreg., U.S.A. These transducers will be hereinafter described in greater detail. As shown in FIG. 10, each of the position sensors PS "1," PS "2," PS "3," PS "4" includes a housing that is mounted in a stationary position on a frame portion of the conveyor. A cable C (FIGS. 10 and 16) extends outwardly from the housing and is connected at its outer end to a movable member that is associated with its set of conveyor slats. The cable C can be connected to the transverse drive beam 94. Or, it can be connected to the moving component of its drive unit 26. Or, it can be connected to one of the conveyor slats CS of its set of slats. The statement herein that the position sensor is connected to the movable portion of the drive unit includes indirect connections. It includes connections to the transverse drive beams 94 and connections to the slats themselves. A spring inside the housing acts on the cable and pulls the cable into the housing. Movement of the outer end of the cable away from the housing pulls the cable out from the housing. The amount of this movement is sensed by the position sensor. An outlet voltage is provided that is directly proportional to cable extension. Longitudinal movement of each conveyor slat set is sensed by the position sensor for the set. The linear position sensors PS inform the controller 98 of the exact position of each conveyor slat set. As will be explained below, this information is used to adjust the flow of hydraulic oil to the working chambers of the drive units 26. Herein, the term "flow" is used to mean the volume of fluid delivered per increment of time, e.g. gallons per second.

Preferably, the housing portions of position sensors PS "1," PS "2" are connected to one of the end frame members 70, 72. The other position sensors PS "3," PS "4" are connected to the center frame member 74. In each case, this includes indirect connections. In preferred form, the outer ends of the cables are attached to the transverse drive beams 94. This is shown in FIG. 16. Preferably also, the valve stack 100 is attached to center frame member 74. It may be connected to an underneath portion of member 74, outwardly of one of the main frame beams.

As shown by FIG. 16, the system includes a programmable processor 96 that transmits electrical control signals to a controller 98 that also receives electrical control signals from the position sensors PS "1," PS "2," PS "3," PS "4." Processor 96 sends signals telling the controller a desired pattern of movement of the slat sets. As will hereinafter be explained in more detail, position sensors PS "1," PS "2," PS "3," PS "4" send signals telling the controller 98 the true positions of the slat sets "1," "2," "3," "4." The controller 98 processes the two sets of signals and then sends instruction signals to four proportional amplifiers PA "1," PA "2," PA "3," PA "4." The proportional amplifiers PA "1," PA "2," PA "3," PA "4" send control signals to the proportional directional control valves PDC "1," PDC "2," PDC "3," PDC "4." The proportional amplifiers PA "1," PA "2," PA "3," PA "4" are available from the Rexroth Corporation, 2315 City Line Road, Bethlehem, Pa. 18017-2131. They are termed Mobile Dual Solenoid Driver (MDSD), catalog number RA 29 864/01.94. They receive an input voltage signal from controller 98, in the range of −10 to +10 volts, and, in turn, amplify the signal to a pulse with modulated output signal that generates a selected current for controlling the PDC valves PDC "1," PDC "2," PDC "3," PDC "4." The following table shows selected output current signals from the proportional amplifiers PA "1," PA "2," PA "3," PA "4" for a desired flow rate:

| | |
|---|---|
| 1 GPM | 431 mA |
| 2 GPM | 494 mA |
| 3 GPM | 542 mA |
| 4 GPM | 564 mA |
| 5 GPM | 587 mA |
| 6 GPM | 600 mA |
| 7 GPM | 616 mA |
| 8 GPM | 632 mA |
| ● | ● |
| ● | ● |
| ● | ● |
| ● | ● |
| 11 GPM | 750 mA |

Figure 23:
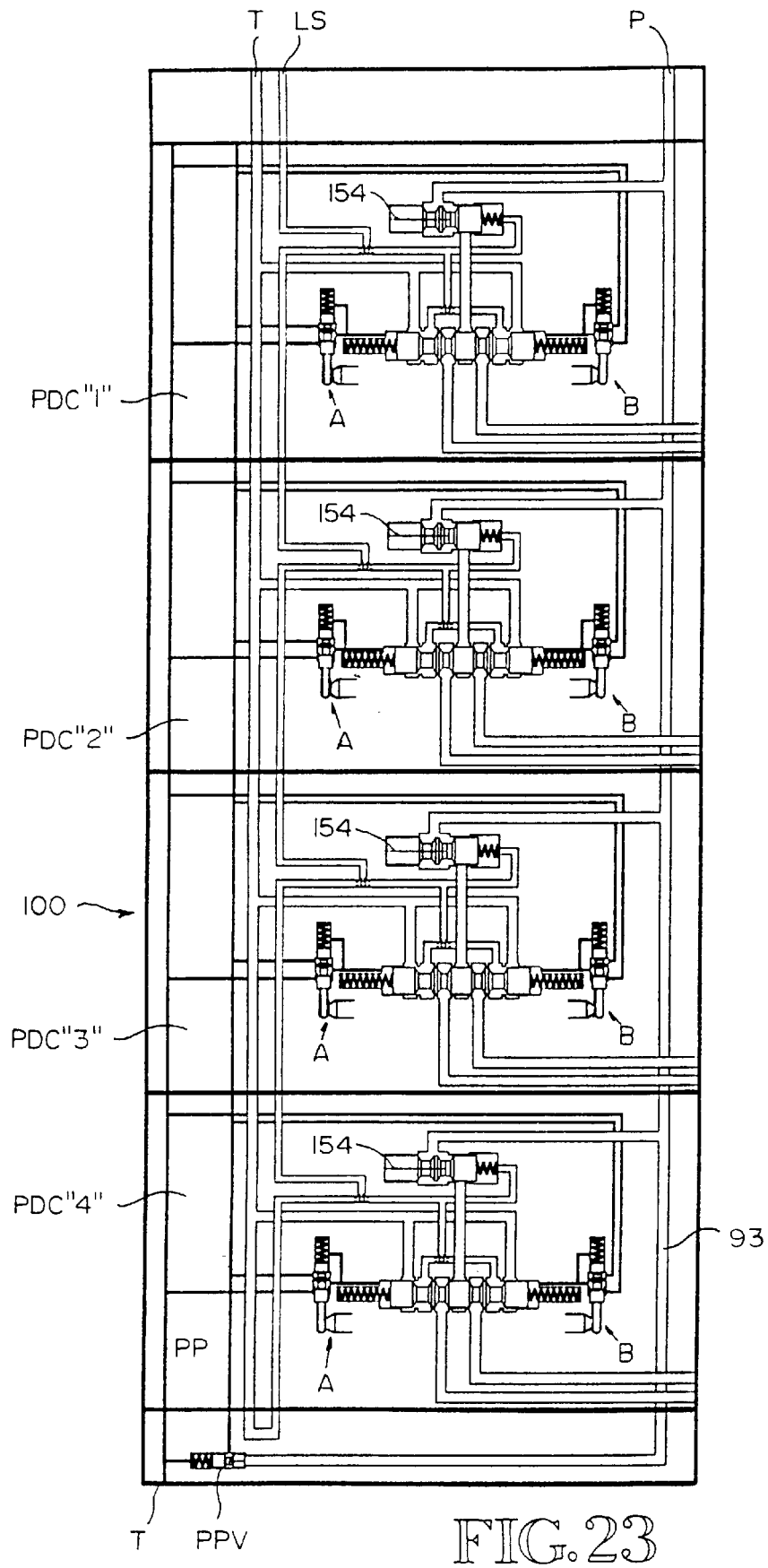
FIG. 23 is a schematic diagram of the four control valves for the four drive units of the preferred embodiment.
Figure 24:
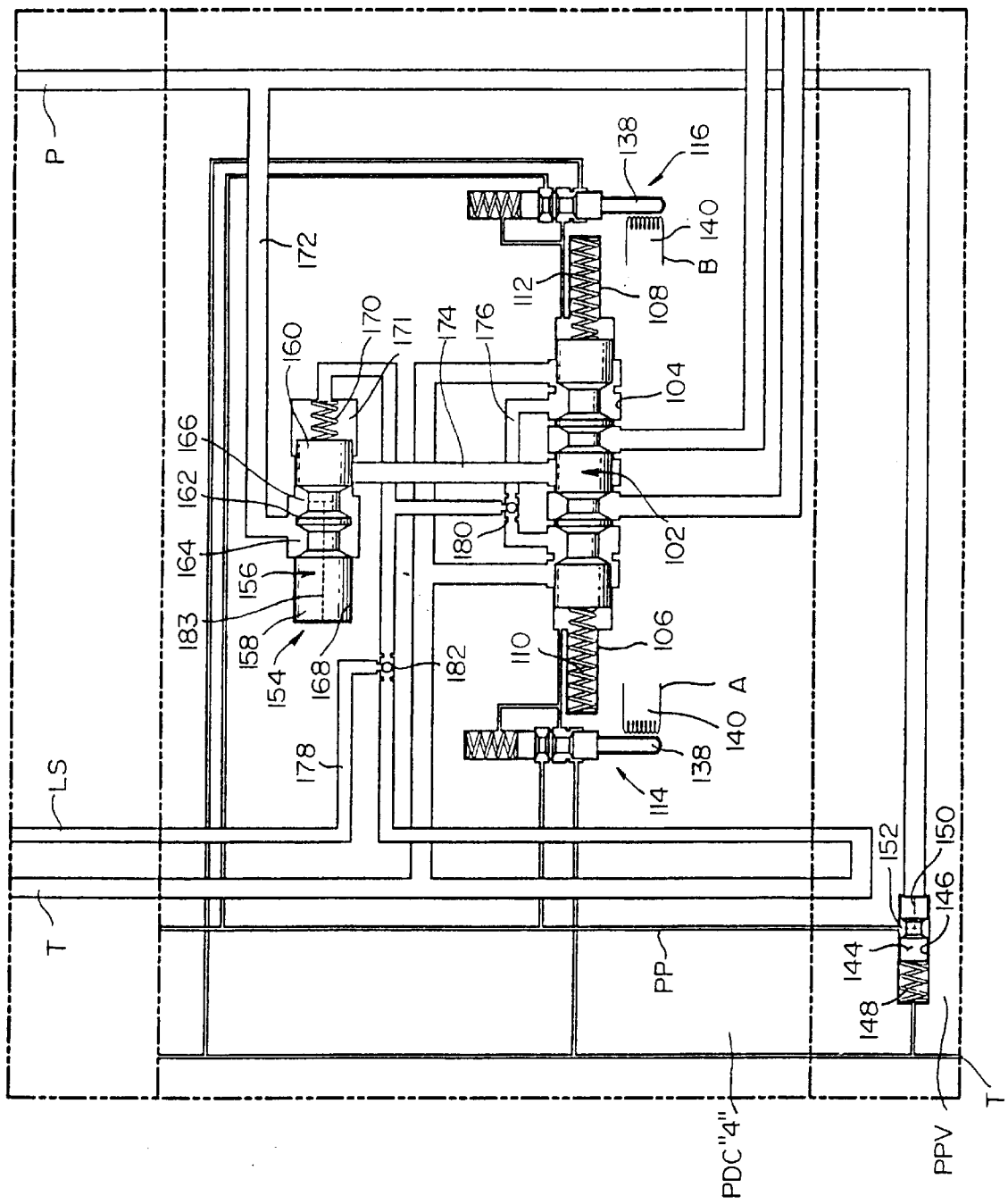
FIG. 24 is an enlarged scale, longitudinal sectional diagram of one of the control valves, showing its components in the positions they occupy when the valve is in a "system off" position.
Figure 25:
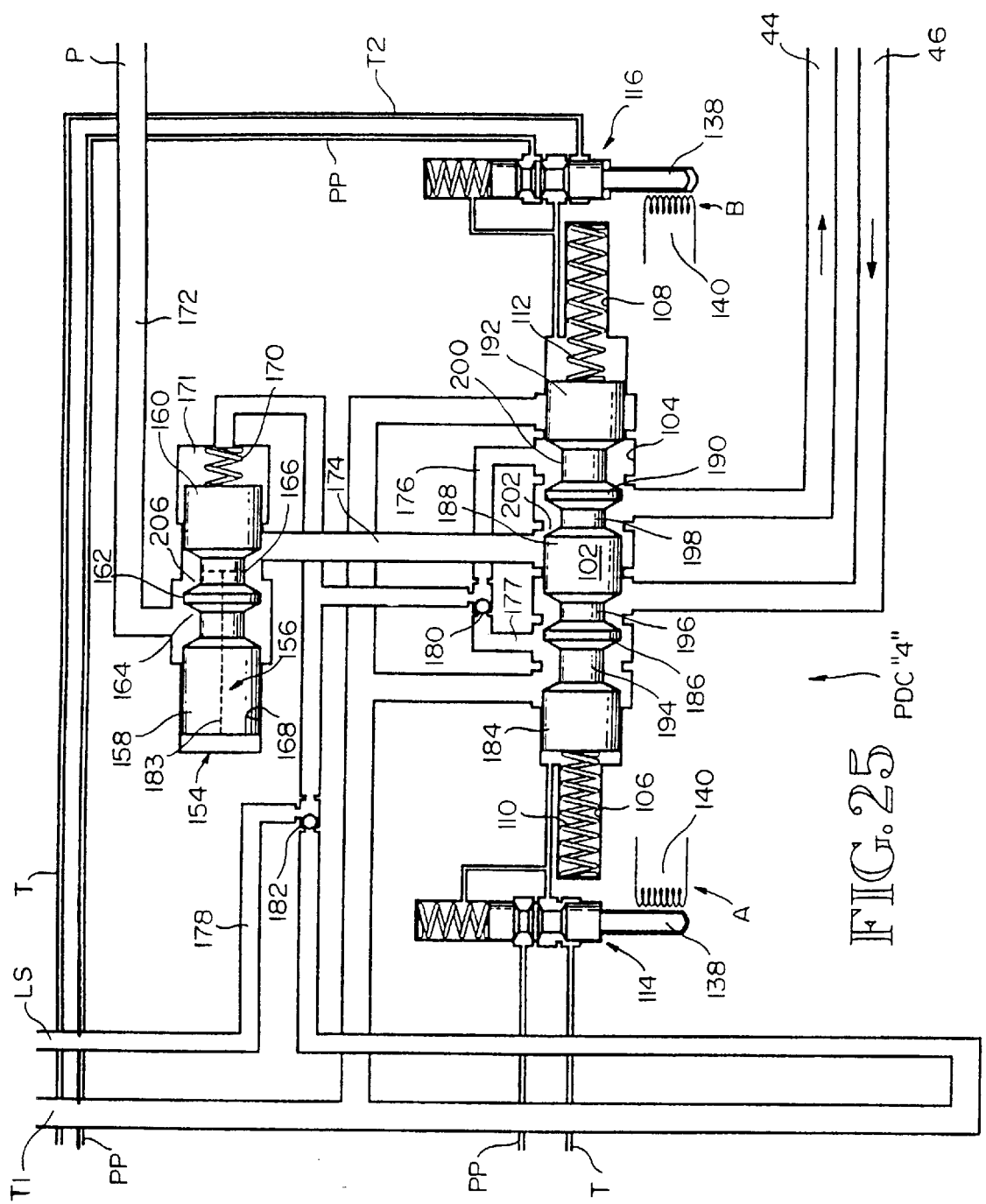
FIG. 25 is a view like FIG. 24, but showing the components of the control valve in the positions that they occupy when the valve is in an "advancing" position.

In FIG. 16, the four PDC valves PDC "1," PDC "2," PDC "3," PDC "4" are shown inside of a broken line box 100. Box 100 represents a valve assembly formed when the four PDC valves PDC "1," PDC "2," PDC "3," PDC "4" are stacked together. The valve assembly 100 is shown in FIGS. 10 and 23. FIGS. 24–26 illustrate PDC valve PDC "4." PDC valves PDC "1," PDC "2," PDC "3" are identical to PDC valves PDC "4." Thus, FIGS. 24–26 also show operational positions assumed by valves PDC "1," PDC "2," PDC "3."

Figure 26A:
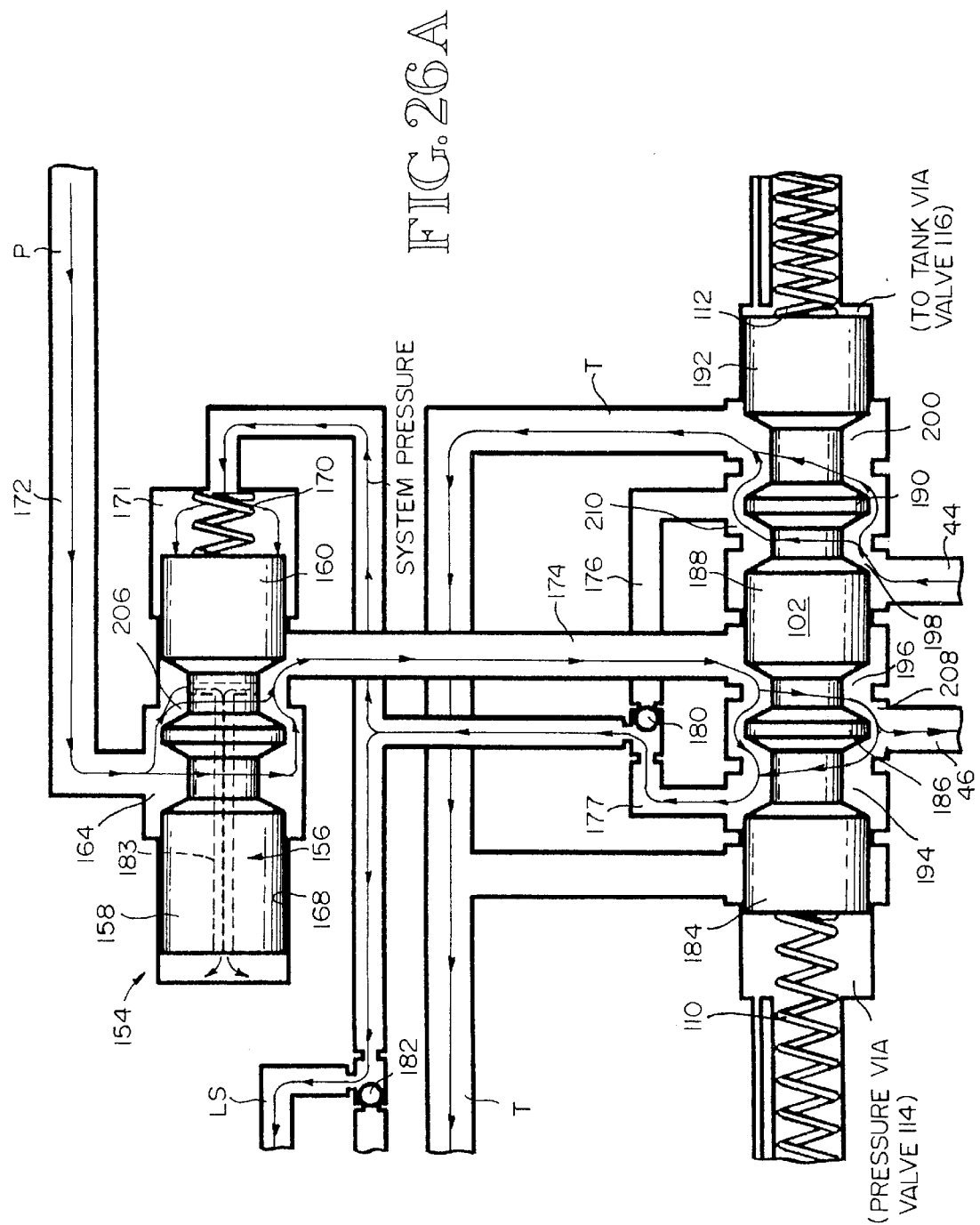
FIG. 26A is an enlarged scale view of a central portion of the valve shown in FIG 26.
Figure 28:
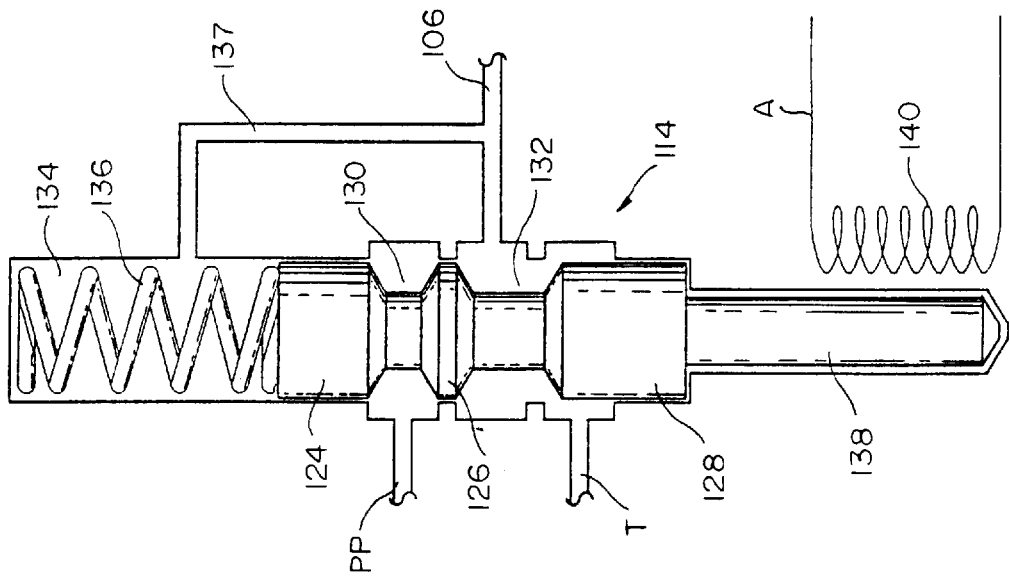
FIG. 28 is a view like FIG. 27, but showing the solenoid off and the spring acting to move the valve spool into a position wherein the pilot chamber port is connected to return.
Figure 27:
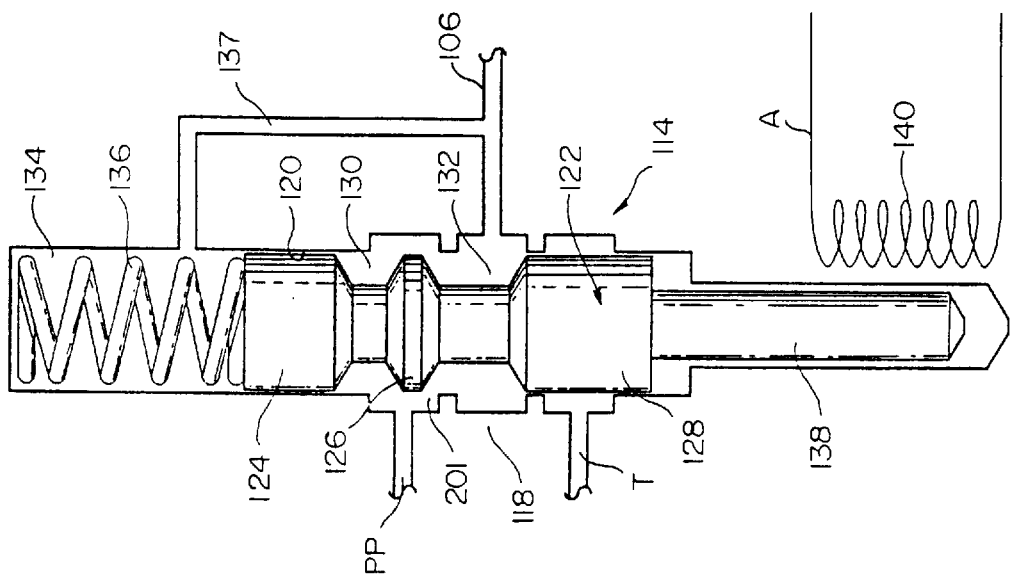
FIG. 27 is an enlarged scale longitudinal sectional view of a pilot valve that is biased in one direction by a spring and movable in the opposite direction, against the force of the spring, by a solenoid, such view showing the solenoid being used to move the valve spool against the spring, to connect a pilot chamber port with pressure.

Referring to FIGS. 24–28, each PDC valve PDC "1," PDC "2," PDC "3," PDC "4" includes a main valve spool 102 positioned within a valve spool chamber 104. Pilot chambers 106, 108 are provided at the opposite ends of the spool chamber 104. A first compression spring 110 is within pilot chamber 106. A second compression spring 112 is within pilot chamber 108. The springs 110, 112 exert spring forces on the opposite ends of the spool 102. When the springs 110, 112 are the only forces acting on the spool 102, the spool 102 is in a centered position, as shown in FIG. 24. A solenoid controlled pilot valve 114 is associated with pilot chamber 106. An identical solenoid controlled pilot valve 116 is associated with pilot chamber 108. FIGS. 27 and 28 show two positions of pilot valve 114. Because the two pilot valves 114, 116 are identical, FIGS. 27 and 28 also show the two positions of pilot valve 116. Pilot valves 114, 116 are three-way valves. In FIGS. 27 and 28, the pressure and return lines are designated "PP" for pressure and "T" for tank or return. The third port of each pilot valve 114, 116 leads to the pilot chamber 106. Thus, in FIGS. 27 and 28 the third port is designated 106.

Pilot valve 114 has a housing 118 formed to include a valve spool chamber 120. A valve spool 122 is located in the valve spool chamber 120. Valve spool 122 is formed to include three lands 124, 126, 128. Lands 124, 126 are separated by a groove 130. Lands 126, 128 are separated by a groove 132. Housing 118 includes a fluid chamber 134 endwise outwardly from land 124. A compression spring 136 is located within chamber 134. It biases the valve spool 122 into the position shown by FIG. 28. In this position, the land 126 blocks pressure movement through the pilot valve 114. Groove 132 is positioned to connect pilot chamber port 106 with the return or tank conduit T. A fluid conduit 137 connects chamber 134 with pilot chamber port 106. There is a solenoid A at the end of valve spool 122 opposite the spring 136. A solenoid rod 138 projects axially outwardly from land 128, into a position to be influenced by a solenoid coil 140 acting on the rod 138. The valve spool is moved into a closed position by the spring 136. It is moved into an open position by a magnetic force generated by the coil 140. Conduit 137 connects chamber 134 with whatever pressure is in the pilot chamber 106.

Referring back to FIG. 23, a pilot pressure valve PPV is shown positioned between the pressure conduit 93 and a pilot pressure line PP. As is known in the art, the valve PPV is included in the system to stabilize the pilot pressure to a desired level. Referring to FIG. 24, the valve PPV is shown in a larger scale than it is in FIG. 23. It is shown to include a valve spool 144 in a chamber 146. A spring 148 is provided in the chamber 146 on the downstream side of the valve spool 144. The spring portion of chamber 146 is connected to a line T that extends back to the tank. Pressure is communicated via an internal passageway 150 in valve spool 144 to the groove region 152. The groove region 152 communicates with the pilot pressure conduit PP. Pressure in conduit 93 acting on the end of valve plug 144 opposite the spring 148 may move the valve spool 144 and in the process regulate the pressure in pilot pressure conduit PP.

FIGS. 23–26 also show that each PDC valve PDC "1," PDC "2," PDC "3," PDC "4" includes a flow control valve 154 section 154. Its function is to maintain flow substantially constant in response to pressure changes. Referring to FIG. 24, each valve section 154 includes a valve spool 156 having a land 158 at one end, a land 160 at its opposite end and a land 162 generally at its center. A groove 164 is formed between land 158 and land 162. A second groove 166 is formed between land 160 and land 162. Valve spool 156 is located within a spool chamber 168. A spring 170 is in an end portion of chamber 168 and bears against land 160. Spring 170 biases valve spool 156 into a position in which both grooves 164, 166 are in a chamber space that receives pressure from conduit 172. In this position, land 160 blocks pressure communication from such chamber space to a conduit 174 that leads to the inlet of the main valve section that includes main valve spool 102 and main valve chamber 104. The spring chamber 171 is connected to a first conduit 176 and a second conduit 178. A check valve 180 is positioned between the spring chamber 171 and the conduit 176. A second check valve 182 is positioned between the spring chamber 171 and conduit 178.

The function of valve section 154 is to maintain a predetermined substantially constant flow to and through the main section 102, 104 of the switching valve regardless of changing load pressures. Valve spool 156 includes an internal passageway 183 that leads from groove 166 to the chamber space 168 opposite spring 170. Pressure in groove 166 is communicated via passageway 183 to the end of chamber 168 opposite the spring 170. This pressure acts on the end of valve spool 156, in opposition to the sum of the force of spring 170 and a force exerted by fluid pressure in chamber 171. An increase of pressure in groove 166 will move the valve spool 156 to the right (as pictured) and in the process will decrease flow through the valve 154. In response to a decrease of pressure in conduit 172, the valve spool 156 will move to the left (as pictured), by action of spring 170, and in the process will increase the flow through valve 154.

Referring to FIG. 25, valve spool 102 is composed of axially spaced apart lands 184, 186, 188, 190, 192 separated by grooves 194, 196, 198, 200. In FIG. 25, pilot valve 114 is in the position shown by FIG. 28. Pressure to chamber 106 is blocked. There is no pressure inside of chamber 106. Chamber 106 is connected by valve 114 to the return or tank line T2. Spring 110 acts by itself to urge the valve spool 102 to the right (as pictured). Valve 116 is energized into a position such as shown by FIG. 27. Pressure from conduit PP passes through a valve passageway 201 to and through the pilot chamber conduit and into the pilot chamber 108. There it acts with the spring 112 to urge the valve spool 102 to the left (as pictured) into a position opening valve passageway 202. Pressure from conduit 174 moves through valve passageway 202 and into the port 44 at an end of the drive unit 26 for set "4" slats. Pressure downstream of the valve passageway 202 moves into conduit 176 and closes check valve 180. It moves on and closes check valve 182 and moves on into conduit 178. It also moves into the chamber in valve 154 at the spring end of valve spool 156. The spring 170 and this pressure act on the right end of valve spool 156 (as pictured). Pressure from conduit 172 acts on the opposite end of the valve spool 156. The pressure differential moves the valve spool into a position such as shown in FIG. 25. This opens a valve passageway 206. Flow through the passageway 206 is the designed flow for the system. The purpose of valve 154 is to substantially maintain this flow despite pressure variations in the system. The pressure downstream of passageway 206 is transmitted via conduits 174, 178 to a conduit LS that leads back to the pump and performs a control function in the pump that is not a part of this invention.

When the set "4" slats reach their advanced position, an electrical signal from controller 98 will deactivate solenoid B and activate solenoid A. The spring in pilot valve 116 moves the valve spool into a position that shuts off pressure communication with the chamber 108 and instead connects chamber 108 to return via tank line T. Solenoid A moves the valve spool of pilot valve 114 to open communication between pressure in conduit PP and pilot chamber 106. Pressure introduction into pilot chamber 106, and connection of pilot chamber 108 with return, results in a shifting of valve spool 102 to the right (as pictured), into a position opening valve passageway 208 (FIG. 26). Pressure from conduit 172 is directed through valve passageway 208 to the conduit leading to port 46 in the drive unit 26 for slat set "4." Return flow from port 44 of the same drive unit 26 flows through valve passageway 210 and then through passageway 212 through the return line leading to tank T. As will hereinafter be described in greater detail, when the PDC valve PDC "4" is in the position shown by FIG. 26, it directs fluid pressure to port 46 and returns fluid from port 44, to cause the drive units to retract. Valve passageway 208 is larger than the valve passageway 202 that is opened when the drive unit is causing the set "4" slats to advance. As a result, there is a substantially greater movement of fluid into and out of the working chambers when the drive unit 26 is retracting its set of slats. The result is that the slats are retracted at a faster rate than they are advanced. When the set "4" slats are fully retracted, an electrical signal is sent to the solenoids A, B. In response, solenoid A closes pilot valve 114 and solenoid B opens pilot valve 116, causing the valve spool 102 to move back to about its FIG. 25 position.

In the preferred embodiment, the proportional amplifiers PA receive an input volt signal from controller 98, in the range of −5 to +5 volts. The proportional amplifiers PA amplify the received signal to a pulse width modulated output signal that generates a selected current for controlling the solenoid valves 114, 116. An input signal in the range of −5 to 0 volts, for example, to a proportional amplifier PA, causes a corresponding output current signal to be sent to one or both solenoids of the PDC valve associated with the proportional amplifier PA. This output current signal operates the pilot valve 114 or 116 in a manner that causes a pressure level and/or direction change in the hydraulic fluid that is being moved into and out from the drive units 26. A 0 to +5 volt input signal to a proportional amplifier PA, causes a corresponding output current signal to be sent to the other solenoid of the control valve, causing its valve spool to move in an opposite direction. The two solenoid controlled pilot valves 114, 116 control the pressure level and/or direction of hydraulic fluid movement into and out from the working chambers of the drive units 26.

An advantage of the Rexroth MP-18 PDC valve is that the starting point for movement of the function always remains the same, i.e., a specified control spool position always has the same flow rate. This is accomplished by the compensator presence of the valve section 154 in each PDC valve. In summary of the description of the PDC valves, each PDC valve includes a main valve spool 102 and is a three-position four-way valve that is spring centered. The compensator valve section 154 performs the function of maintaining a constant oil flow, regardless of pressure fluctuations. Pilot valves 114, 116 are actuated by solenoids A, B. Solenoids A, B receive control signals from the proportional amplifiers PA "1," PA "2," PA "3," PA "4." Operation of the pilot valves 114, 116 controls the position, via fluid pressure, of the main valve spool 102.

Figure 17:
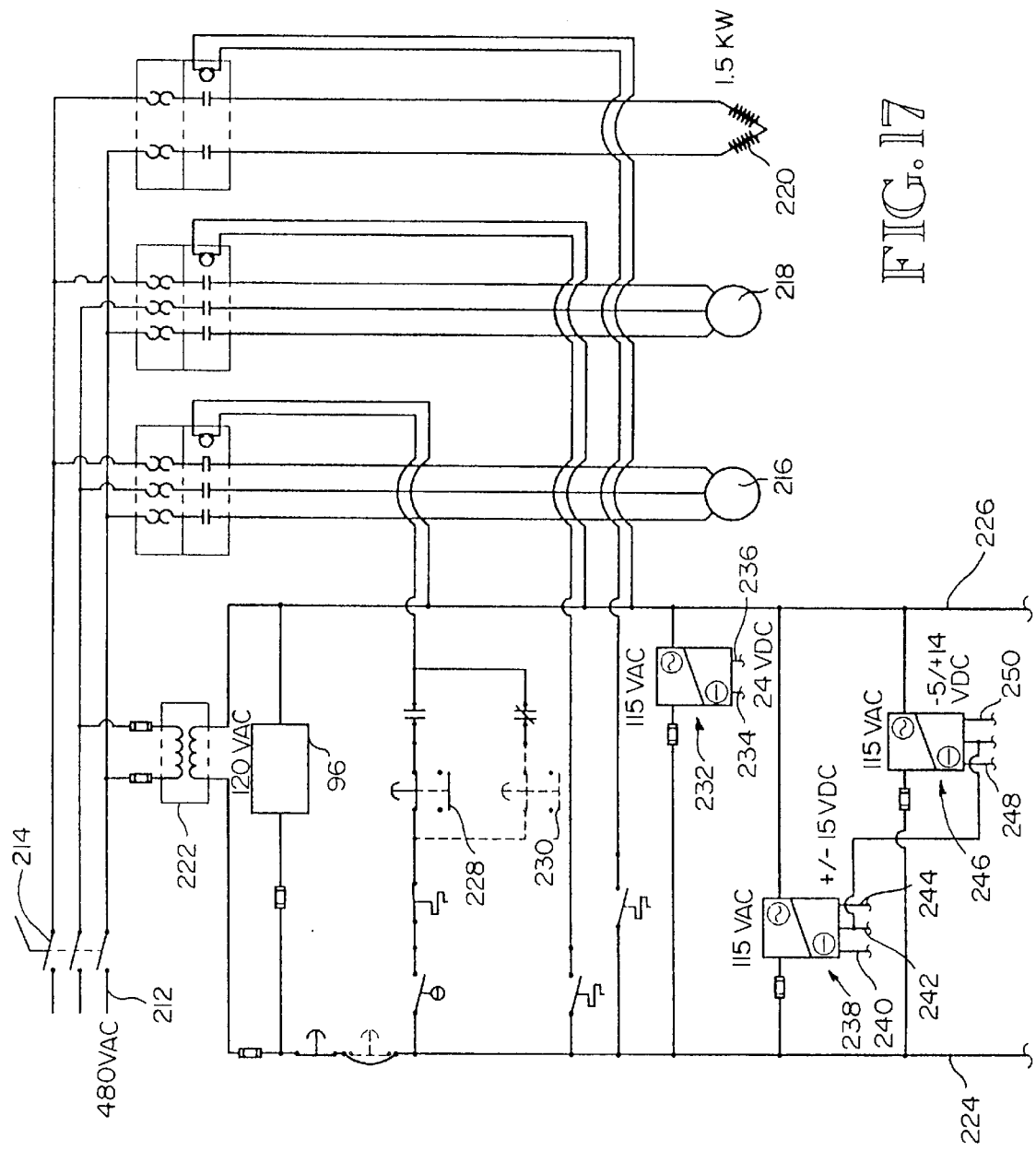
FIG. 17 is a schematic diagram of the power circuit for the preferred embodiment.
Figure 18:
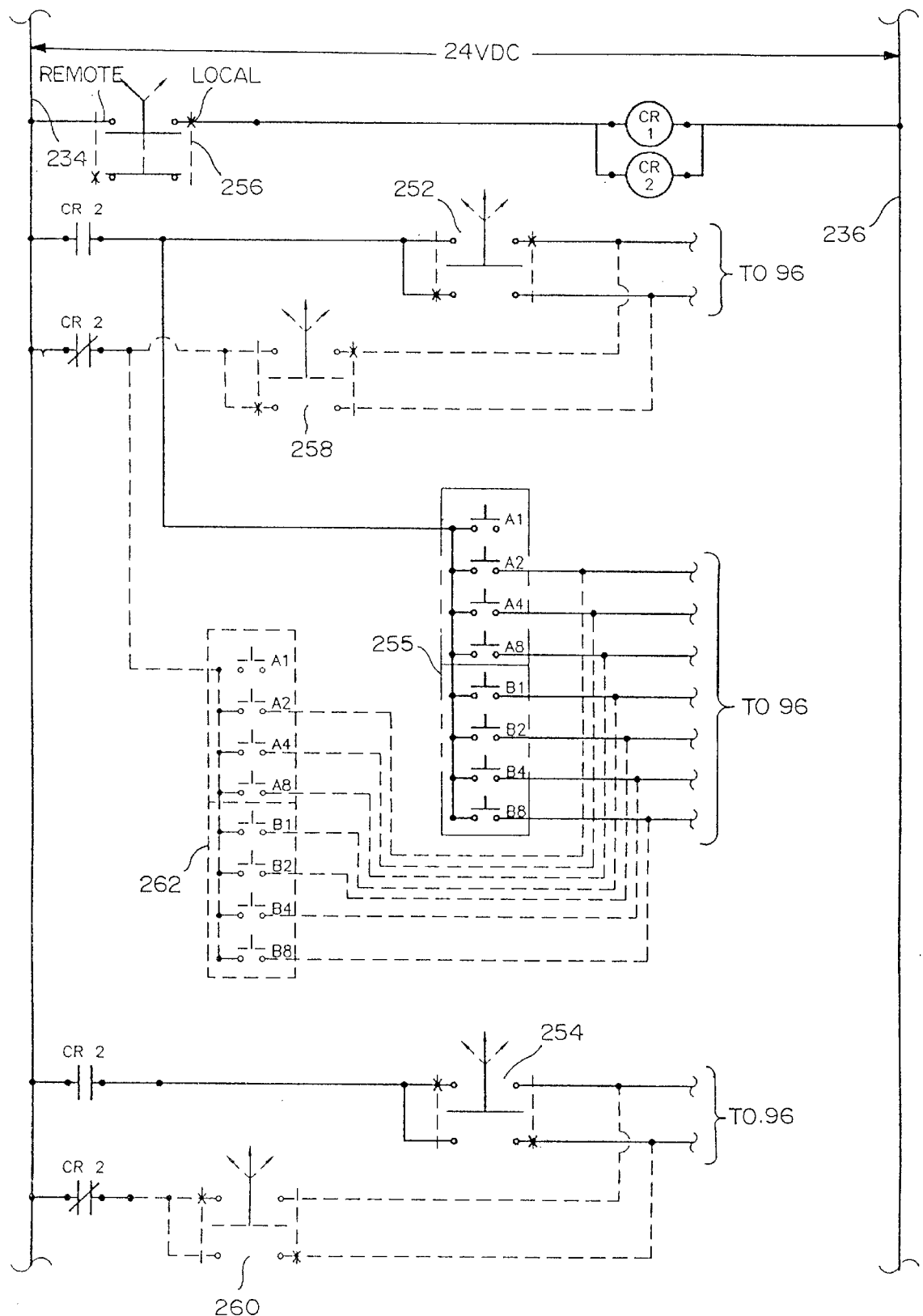
FIG. 18 is a ladder diagram of an off-on and forward-reverse control, a fast forward-fast-reverse control and a speed control.
Figure 22:
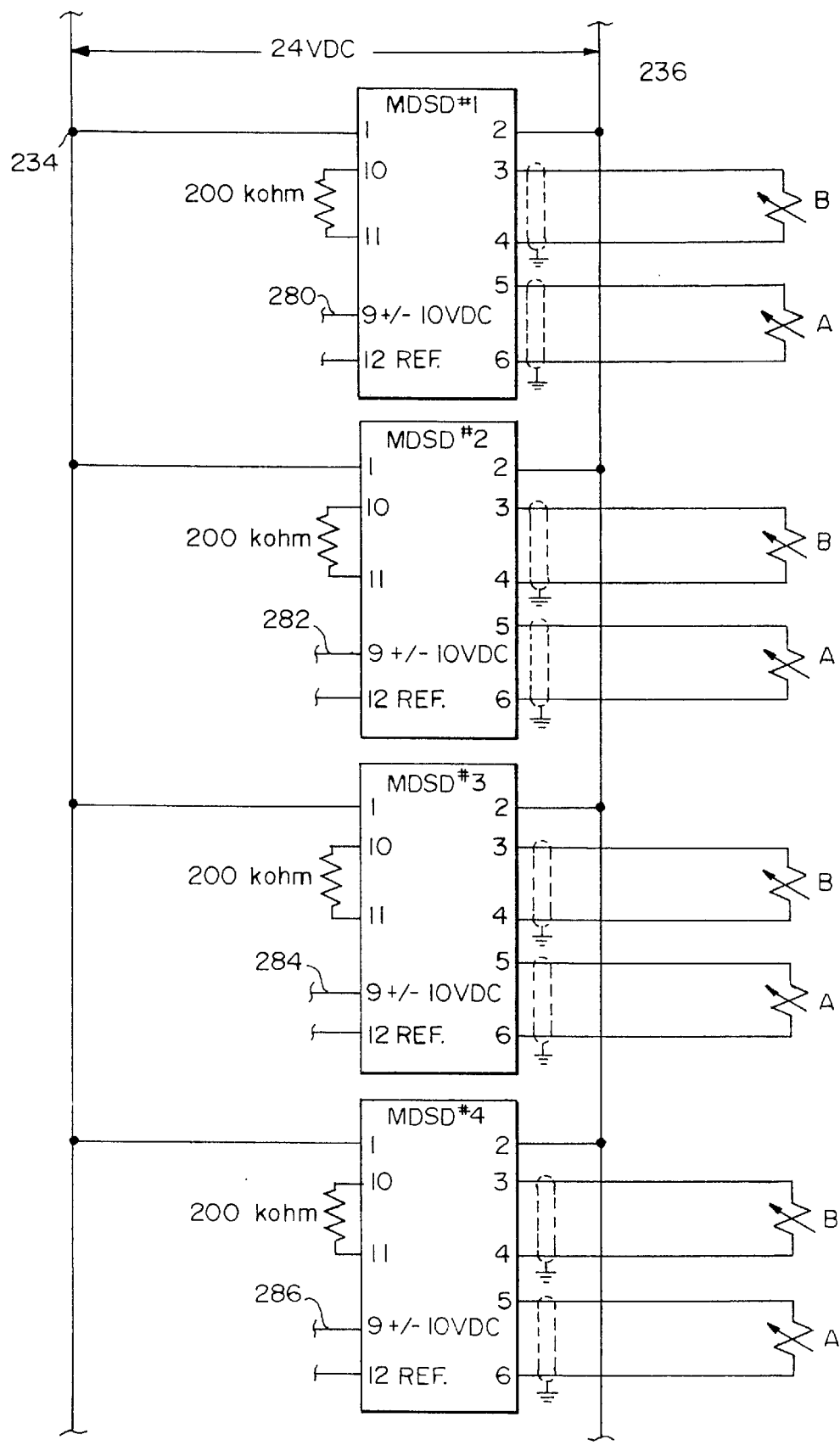
FIG. 22 is a ladder diagram of four proportional amplifiers that receive control signals from the controller and send control signals to solenoids that are a part of the control valves for the drive units.

FIG. 17 shows the main power portion of the control circuit. 480 volts AC are provided at 212. A main on/off switch is designated 214. Electrical energy is delivered to a 40 -horsepower pump motor 216, to a ⅙ horsepower cooling fan motor 218 and to a 1.5 KW tank heater 220. The pump P (FIG. 16) is for pumping oil 10 through the system. The cooling fan is for cooling the hydraulic fluid or oil when it is hot. The tank heater is for heating the oil when it is cold. A transformer 222 provides 120 volts AC across conductors 224, 226. A pump motor start/stop switch 228 is provided on a local control panel. A second, remote pump motor start/stop switch 230 may also be provided. A 115 volt AC to 24 volt DC transformer is provided at 232. Its output conductors 234, 236 are shown in FIGS. 17, 18 and 22. A 115 volt AC to +/−15 volts DC transformer is provided at 238. Its output conductors 240, 242, 244 are connected to the controller PFC-5 (FIG. 21). A 115 volt AC to a −5/+14 volt DC transformer is provided at 246. It provides power for the position sensors. Its output conductors 248, 250 are shown in both FIG. 17 and FIG. 20. The programmable processor 96 (FIG. 17) operates at 120 volts AC and receives input instructions or signals from a forward and reverse control 252 (FIG. 18), a jog override control 255 (FIG. 18), and a speed control thumb wheel 256 (FIG. 18). Optional remote controls 256, 258, 260, 262 can also be provided for remote operation of the conveyor. Control 256 switches between "remote" and "local" operation. Control 258 provides for remote control of "forward" and "reverse." Control 260 is a remote jog override switch. Control 262 is a remote thumb wheel.

The output of the programmable processor 96 is connected to the controller 98 at pins 264, 266, 268, 270. The output of the position sensors PS "1," PS "2," PS "3," PS "4" are designated 272, 274, 276, 278. They are connected to the controller 98 where indicated in FIG. 21. The outputs from the controller 98 are designated 280, 282, 284, 286. They are connected to the proportional amplifiers PA "1," PA "2," PA "3," PA "4" where indicated in FIG. 22. The outputs of the proportional amplifiers PA "1," PA "2," PA "3," PA "4" are connected to the solenoids A, B of the PDC valves PDC "1," PDC "2," PDC "3," PDC "4."

The programmable processor 96 can be a programmable logic controller (PLC) for example. As a second example, it can be a microprocessor. In preferred form, it is a PLC that includes the following components, each of which is available from Allen-Bradley, of Milwaukee, Wis. U.S.A.:

| | |
|---|---|
| SLC 500 | ABPLC 174 |
| Expansion Rack | ABPLC 1746AZ |
| Analog I/O | ABPLC 1746N14 |
| Analog Module | ABPLC 1746NO4V |
| Input/output Card | ABPLC 1746N104 |
| Battery | ABPLC 1747BA |

Programmable processor 96 provides a command signal for each PDC valve. Let it be assumed that all four drive units 26 are retracted. The programmable processor 96 will first control the PDC valve "1" for slat set "1," causing the valve passageway or orifice 202 (FIG. 25) to open and allow movement of hydraulic fluid drive unit into port 44 and out from port 46 at a predetermined rate, so that the "1" slat sets will move forwardly at a predetermined desired speed. When the set "1" slats have moved S/4, the programmable processor 96 sends essentially the same command to the PDC valve "2" for the set "2" slats, causing them to move forward at the same rate of speed as the set "1" slats. As in the case of PDC valve "1," the signal from the programmable processor 96 will move the main spool 102 in PDC "2" a distance sufficient to open valve passageway or orifice 202 a sufficient amount to cause oil movement into port 44 and out from port 46 of the set "2" drive unit 26, to start it moving at the right time and the right speed. When set "1" slats travel another S/4, to position S/2, the programmable processor 96 will send a signal to PDC "3," commanding it to open and start movement of the set "3" slats, at the desired speed. When the set "1" slats reach position 3 S/4, the programmable processor 96 will send a signal to PDC "4," moving its main spool 102, so as to cause the set "4" slats to move forwardly at the desired speed. When the set "4" slats start to move, all four slat sets will be moving together and will continue to move together until the set "1" slats reach their advanced position. At that time, the controller 98 will send a new signal to PDC "1," directing it to both reverse the connection of pressure and return to the ports 44, 46 and open valve passageway 208 (FIG. 26) a sufficient amount to cause the set "1," drive unit 26 to retract at a fast speed.

A control panel (not shown) is provided that includes, amongst other things, an on/off switch 252 having an "off" position, a "rev" reverse position and a "frd" forward position. A "jog" switch 254 may also be provided. This switch overrides switch 252 and causes the drive units 26 to extend or retract at their highest rate of speed, which may be necessary at times for safety purposes. A speed control thumb wheel 255 is provided to change the overall speed of the slat conveyor, i.e. to speed up or slow the rate at which the conveyor moves a load thereon. The logic for processor 96 creates electrical signals that, when further processed and delivered to the PDC valves, establish a first slat speed in the conveying or advancing direction and a second, and faster, retract speed in the opposite direction. Switch or control 252 establishes the conveying and retracting directions. When control 252 is in its "off" position, the processor 96 and controller 98 sends signals to the PDC valves, placing such valves in a "system off" position such as shown in FIG. 24. If it is desired to convey a load towards the rear of the conveyor, as is most often the case, the control 252 is moved to the "frd" position. When control 252 is in the "frd" position, the processor instructs the PDC valves to direct fluid into drive unit ports 44, and out from drive unit ports 46, for conveying the load towards the rear of the conveyor. When control 252 is in the "rev" position, the processor 96 commands the PDC valves to introduce fluid into drive unit ports 46, and remove fluid from drive unit ports 44, for conveying a load towards the front of the conveyor. Control 255 controls the conveying and retraction speeds of the drive units. It does this by changing the electrical signal output of processor 96 to the PDC valves, for changing the commanded amount of movement of the main valve spools of these valves and, consequently, the sizes of the fluid passageways 202, 208 in the main sections of the PDC valves. As previously stated, the control 254 overrides control 256 and momentarily, at least, causes the drive units to extend or retract at their highest rate of speed.

Figure 29:
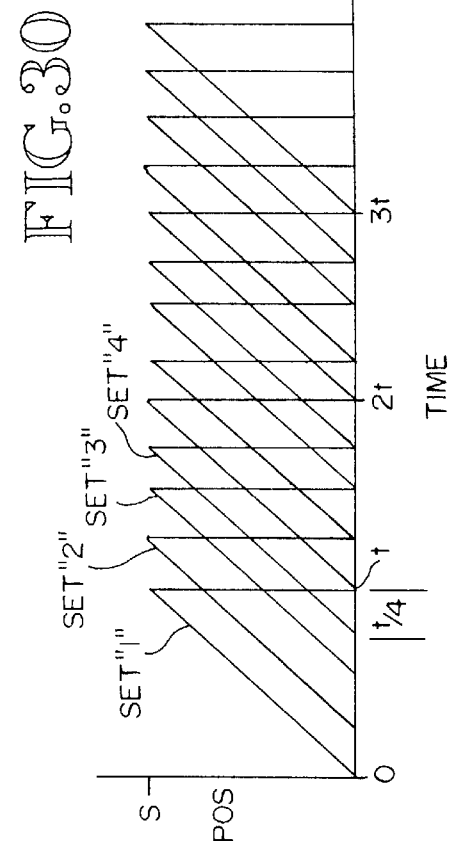
FIG. 29 is a graph plotting the commanded position of the set "1" slats as established by command signals that the programmable processor sends to the PDC valve "1" for the drive unit that drives the set "1" slats.
Figure 30:
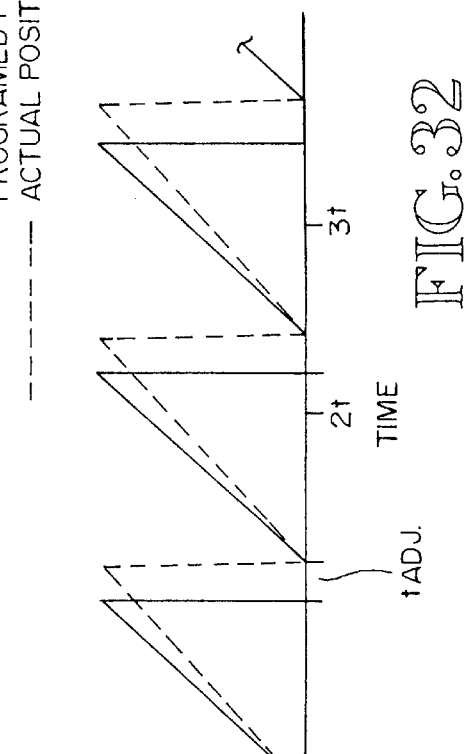
Figure 31:
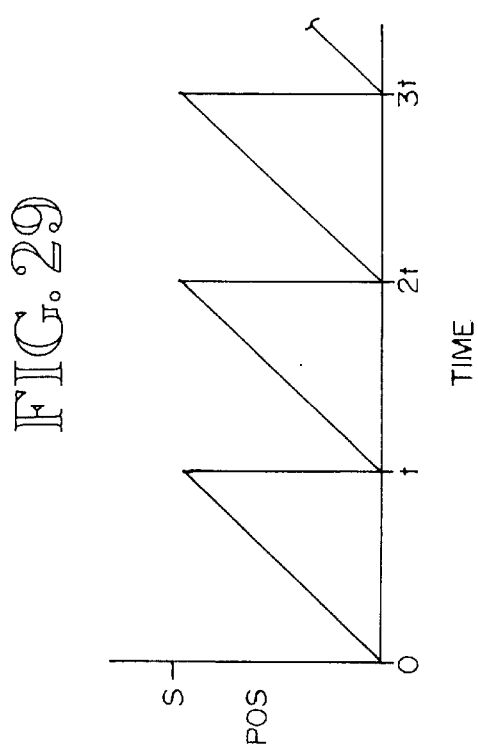
FIG. 31 is a graph of the actual position of the set "1" slats superimposed on the graph of FIG. 29.
Figure 32:
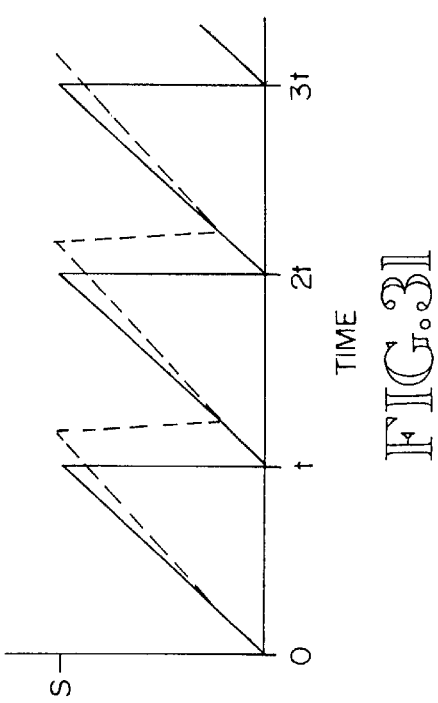
FIG. 32 is a view like FIG. 31, but showing the start of subsequent slat movement command signals delayed to allow full retraction of the conveyor slats.

FIG. 29 is a graph of the command signal from the programmable processor 96 to the cylinder 26 for the set "1" slats. Point zero is the starting point. At this point, the set "1" slats and their drive unit 26 are retracted. The distance S is the stroke length of the set "1" slats. The programmable processor 96 sends electrical control signals to the PDC valve "1", via controller 98, instructing it to advance the set "1" slats stroke length S within the time t. Then, the programmable processor 96 commands a return to zero and next commands a second advance by an amount S within a second interval of time t. This command pattern from the programmable processor 96 is repeated over and over. FIG. 30 shows that after the set "1" slats have moved a distance S/4, the programmable processor 96 commands the PDC valve "2" to start movement of the set "2" slats. At t/2, the programmable processor 96 commands the PDC valve "3" to start the set "3" slats moving. At time 3t/4 the programmable processor 96 commands the PDC valve "4" to start movement of the set "4" slats. As illustrated, this pattern of commands is repeated over and over. FIG. 30 shows that between 3t/4 and t, all four sets of slats are advancing together. FIG. 31 shows a hypothetical graph of the actual position of the set "1" slats superimposed over the position of these slats commanded by the programmable processor 96. Of significance, it takes time for each slat set to retract after it has reached the advanced position 14. The FIG. 31 graph shows that if there is no adjustment in the command signal sent out by programmable processor 96, the set "1," slats will retract until they intersect the position of the set "1" slats in the second cycle of movement from 0.0 to .S over the next time interval t. At that time they will again start to advance. FIG. 32 shows a simple adjustment that can be made to the command signal in programmable processor 96. A delay t adj., equal to the time for the set "1" slats to retract, can be programmed into the programmable processor 96. This allows the set "1" slats to fully retract before the programmable processor 96 commands them to start moving forward again.

Herein the stroke length "S" is the operative stroke length of the hydraulic drive units 26, established by the control logic and the feedback signals that are fed to the controller 98. The stroke length "S" is also the stroke length of the conveyor slats. Thus, the control system of the present invention might be used with drive units 26 having a 10" stroke capability but the system logic may be designed to utilize only 8" of this capability. Thus, the stroke length "S" of the system would be the 8" even though the drive units 26 have a capability of moving 10". In another system, the system stroke S may be equal to the stroke capability of the drive unit.

In one embodiment of the invention, the drive unit for the lead conveyor slats CS is sent a fixed command signal which tells its PDC valve to deliver oil into the drive unit 26 for the leading conveyor slats CS at the rate necessary for making the leading conveyor slats advance at the desired speed. The drive units for the other three conveyor slat sets will receive the same command if they are all advancing and are traveling at the same speed as the lead set of conveyor slats. If one or more of the conveyor slat sets behind the leading conveyor slat set is lagging or leading its position in the desired pattern of total slat movement, the distance that each slat set is lagging or leading, as sensed by the position sensor PS associated with the slat set, is used to calculate a new command for the slat set in controller 98. The new command will cause the PDC valve to either increase or decrease the flow of hydraulic fluid into and out from the drive unit. The more that a slat set behind the lead slat set deviates from its desired position, the greater the change to the command signal to correct the set's position. In this embodiment, the controller 98 has an execution loop that looks at the state of the feed back signals from the position sensors PS, steps through the ladder logic (96), and modifies the outputs which are the signals that are sent first to the proportional amplifiers PA and then to the PDC valves. In this way, the command to each of the PDC valves for the slat sets that are trailing the lead slat set will be updated every "scan." The typical scan rate is between 5 to 15 milliseconds.

The speed of the returning slat set acts as a limit on how fast the other three slat sets can advance. The returning slat set must return and be ready to become one of the advancing slat sets before the slat set behind it reaches the advanced position 14. The PDC valves have a range of fluid flow that is great enough to retract a drive unit 26 at a high pressure level before the next advancing conveyor slat set reaches the advanced position 14.

In another embodiment, the actual positions of the conveyor slat sets as determined by the position sensors PS are compared with the desired positions of the slat sets as determined by the control logic. Any deviation that is sensed is used to adjust the command signal to the PDC valve for a conveyor slat set that is either leading or lagging its desired position, to adjust the PDC valve towards driving such conveyor slat set either faster or slower, towards its desired position.

FIGS. 25A and 26A probably best show the key flow control components of the preferred embodiment of the invention. Referring to FIG. 25A, pressure P from conduit 172 enters valve section 154 and flows through valve passageway 206 into conduit 174. From conduit 174 it flows through valve passageway 202. Some of the fluid flows into a conduit leading to drive unit port 44. The rest of the fluid flows into conduit 176 and closes check valves 180, 182, as illustrated. Some of the fluid in conduit 176 flows into chamber 171 of valve section 154. This is the system pressure and it exerts a force on the valve spool 156 in addition to the spring force 170. The fluid pressure entering valve 154 also flows into passageway 183, leading to the end of the valve spool 156 opposite spring 170. This pressure P is exerted on its end of the valve spool 156, in opposition to the system pressure in chamber 171 and the spring force 170. Valve spool 156 assumes a position in which it allows the desired amount of fluid to flow through the valve 154. While fluid is being delivered into drive unit port 44, fluid from the drive unit moves out of port 46 and into the valve. It moves through a passageway 196 and into the tank conduit T. The pilot valves 114, 116 (FIG. 25) control the position of valve spool 102. It is the position of valve spool 102 that determines the size of valve passageway 202 and the flow rate through the PDC valve into the drive unit 26. Signals from the position sensor PS "4", indicating that the slat set "4" is either leading or lagging the position it should have in the pattern of slat movement, will signal the pilot valves 114, 116 to adjust the position of valve spool 102 and hence the size of the orifice 202. Orifice 202 is adjusted to change flow through the PDC valve "4" in an amount sufficient to move the slat set towards the position it should occupy.

When the command logic (96) commands the slat set "4" to retract, electrical signals are sent to the pilot valves 114, 116, causing them to shift valve spool 102 into the position shown by FIG. 26A. In this position, the pressure from conduit 174 is directed through valve passageway 208 and then into drive unit port 46. Return flow from drive unit port 44 flows through valve passageway 210 and into the tank line T. Some of the pressure flow moves into conduit 177, closing valves 180, 182, and moves into chamber 171 in pressure compensating valve 154. When the shifting of valve spool 102 occurs, the valve passageway 208 immediately assumes a large enough size to permit pressure movement into port 46 at a rate that will return the slat set much faster than the advance speed of the slat sets. Valve PDC "4" performs a reversing function. It switches pressure and return between the two ports 44, 46 of the drive unit 26. In each position, it provides a valve passageway of sufficient size to effect the desired speed of the slat set. In the advancing direction, the valve passageway 202 is sized to deliver hydraulic fluid pressure at a rate to move the slat set forward at the desired speed. As previously explained, this rate is adjusted by the feedback signal which helps control the positions of the solenoid valves 114, 116. When the PDC valve "4" is commanded to retract the slat set, the valve spool 102 immediately moves to a position that provides a valve passageway 208 of sufficient size to cause a fast return or retraction of the slat set.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A reciprocating slat conveyor comprising:

at least three slat sets of at least one slat each;

a piston-cylinder drive unit for each slat set, each including a stationary component and a movable component, together defining first and second variable volume working chambers on opposite sides of a piston head, each movable component being connected to its slat set, each drive unit having a first inlet/outlet port for said first working chamber and a second inlet/outlet port for said second working chamber;

a pressure conduit connected to a source of hydraulic fluid pressure;

a return conduit connected to tank;

a four-way proportional directional control (PDC) valve for each drive unit, each PDC valve having a first port connected to the pressure conduit, a second port connected to the return conduit, a third port connected to the first inlet/outlet port of its drive unit and a fourth port connected to the second inlet/outlet port of its drive unit;

each said PDC valve having a first position of adjustment in which it connects the first working chamber of its drive unit to pressure and the second working chamber to tank, and a second position of adjustment in which it connects the second working chamber of its drive unit to pressure and the first working chamber to tank;

each said PDC valve also including an electrical signal responsive valve positioning means;

a separate proportional amplifier for each PDC valve, each connected to the valve positioning means of its PDC valve;

a separate linear position sensor for each drive unit, each being connected to the movable component of its drive unit, and each said linear position sensor being operable to provide an electrical control signal indicative of the position of the movable component of its drive unit, and the slat set connected to it;

control logic providing electrical control signals for directing the PDC valves to operate the drive units to advance more than half of the slat sets simultaneously in a first, conveying direction, and to retract the remaining slat sets in the opposite direction at a higher rate of speed; and a controller connected to said logic, to said linear position sensors, and to said proportional amplifiers, said controller being responsive to actual position signals received from said linear position sensors to modify the electrical control signals from said control logic and send a corrected control signal to the proportional amplifiers, said proportional amplifiers sending control signals to the valve positioning means, for adjusting the PDC valves and the rate of hydraulic fluid movement into and out from the working chambers of the drive units for the advancing conveyor slat sets, towards establishing the desired pattern of movement of said slat sets.

2. A reciprocating slat conveyor according to claim 1, wherein each PDC valve has a main valve spool that is moved in response to electrical signals received from the proportional amplifier associated with such valve, with movement of the main valve spool opening a first passageway in the PDC valve to allow hydraulic fluid to move from the pressure conduit through the PDC valve into one of the working chambers, and a second passageway in the valve to allow hydraulic fluid to move out from the other working chamber of the drive unit, through the PDC valve and into the return conduit connected to tank.

3. A reciprocating slat conveyor according to claim 2, wherein the electrical signal responsive valve positioning means comprises a pilot chamber at each end of the main valve spool, and a pilot valve associated with each pilot chamber, each pilot valve including a solenoid for opening the pilot valve, said solenoid being controlled by electrical signals received from a said proportional amplifier.

4. A reciprocating slat conveyor according to claim 3, further comprising two compression springs, one in each pilot chamber, said compression springs contacting the opposite ends of the main valve spool and centering the main valve spool when fluid pressure in the two pilot chambers is balanced.

5. A reciprocating slat conveyor according to claim 4, wherein each pilot valve includes a pilot valve spool, a pilot chamber at one end of the pilot valve spool, and a solenoid at the opposite end of the pilot valve spool, each said pilot valve also including a compression spring in its pilot chamber that acts on the end of its pilot valve spool and normally biases such spool into a first position, said solenoid serving to move the pilot valve spool in the opposite direction, against the force of the spring, by an amount determined by electrical signals sent to the solenoid, said pilot valve connecting the pilot chamber at its end of the main valve spool to return when the pilot valve is in the first position, and communicating pressure to the pilot chamber at its end of the main valve spool in response to solenoid caused movement of the pilot valve spool against the pilot valve spring.

6. A reciprocating slat conveyor according to claim 5, wherein a signal sent by a proportional amplifier to the solenoids for the two pilot valves, will shift the pilot valve spools in directions allowing pressure to be communicated through one pilot valve to the pilot chamber at its end of the main valve spool, while communicating the second pilot chamber at the second end of the main valve spool with return, via the second pilot valve.

7. A reciprocating slat conveyor according to claim 6, wherein a signal sent by a proportional amplifier to the pilot valves, for commanding the PDC valve to retract its set of conveyor slats, will cause the two pilot valves to move the main valve spool into a position in which the first and second passageways through the PDC valve are of sufficient size to cause the drive unit to retract the slat set at a substantially faster speed than the advance speed of the slat set.

8. A reciprocating slat conveyor according to claim 1, wherein each piston-cylinder drive unit has stationary opposite end portions and a movable central portion, wherein a transverse drive beam is connected to each movable central portion, wherein each said drive beam is connected to a separate one of said slat sets, wherein the variable volume working chambers are formed by and between the stationary end portions and movable central portions of the drive units, wherein said first inlet/outlet port is at a first end of the drive unit, and wherein the second inlet/outlet port is at the second end of the drive unit.

9. A reciprocating slat conveyor according to claim 8, wherein each PDC valve has a main valve spool that is moved in response to electrical signals received from the proportional amplifier associated with such valve, with movement of the main valve spool opening a first passageway in the PDC valve to allow hydraulic fluid to move from the pressure conduit through the PDC valve into one of the working chambers, and a second passageway in the valve to allow hydraulic fluid to move out from the other working chamber of the drive unit, into the return conduit connected to tank.

10. A reciprocating slat conveyor according to claim 9, wherein the electrical signal responsive valve positioning means comprises a pilot chamber at each end of the main valve spool, and a pilot valve associated with each pilot chamber, each pilot valve including a solenoid for opening the pilot valve, said solenoid being controlled by electrical signals received from a said proportional amplifier.

11. A reciprocating slat conveyor according to claim 10, further comprising two compression springs, one in each pilot chamber, said compression springs contacting the opposite ends of the main valve spool and centering the main valve spool when fluid pressure in the two pilot chambers is balanced.

12. A reciprocating slat conveyor according to claim 11, wherein each pilot valve includes a pilot valve spool, a pilot chamber at one end of the pilot valve spool, and a solenoid at the opposite end of the pilot valve spool, each said pilot valve also including a compression spring in its pilot chamber that acts on the end of its pilot valve spool and normally biases such spool into a first position, said solenoid serving to move the pilot valve spool in the opposite direction, against the force of the spring, by an amount determined by electrical signals sent to the solenoid, said pilot valve connecting the pilot chamber at its end of the main valve spool to return when the pilot valve is in the first position, and communicating pressure to the pilot chamber at its end of the main valve spool in response to solenoid caused movement of the pilot valve spool against the pilot valve spring.

13. A reciprocating slat conveyor according to claim 12, wherein a signal sent by a proportional amplifier to the solenoids for the two pilot valves, will shift the pilot valve spools in a direction allowing pressure to be communicated through one pilot valve to the pilot chamber at its end of the main valve spool, while communicating the second pilot chamber at the second end of the main valve spool with return, via the second pilot valve.

14. A reciprocating slat conveyor according to claim 13, wherein a signal sent by a proportional amplifier to the pilot valves, for commanding the PDC valve to retract its set of conveyor slats, will cause the two pilot valves to move the main valve spool into a position in which the first and second passageways through the PDC valve are of sufficient size to cause the drive unit to retract the slat set at a substantially faster speed than the advance speed of the slat set.

15. A drive module for a reciprocating slat conveyor, comprising:

a pair of longitudinally spaced apart end frame members, each extending transversely of the conveyor;

a center frame member positioned longitudinally between the two end frame members, and extending transversely of the conveyor;

a first pair of piston-cylinder drive units, extending longitudinally of the conveyor, between a first said end frame member and said center frame member, said drive units each have a fixed end portion connected to the center frame member and a movable portion between the first end frame member and the center frame member;

a second pair of piston-cylinder drive units, extending longitudinally of the conveyor between the center frame member and the second end frame member, said drive units, each having a fixed end portion connected to said second end frame member and a movable portion between the second end frame member and the center frame member;

four transverse drive beams, one for each drive unit, with two of said transverse drive beams being positioned between the first end frame member and the center frame member, and with the remaining two of said transverse drive beams being positioned between the center frame member and the second end frame member; and each said transverse drive beam being connected to the movable portion of a separate related one of the drive units.

16. A drive module according to claim 15, wherein each drive unit has two fixed opposite end portions and a movable center portion, with one of said fixed opposite end portions being connected to a said end frame member and the other being connected to the center frame member.

17. A drive module according to claim 15, wherein the center frame member includes an upper portion and a plurality of bearing supports connected to said upper portion, said bearing supports being beam members that extend longitudinally of the conveyor, whereby in use at least one bearing is connected to each bearing support and each bearing support and bearing receive and support a portion of a reciprocating conveyor slat.

18. A drive module according to claim 17, wherein the center frame member is in the nature of an upwardly opening channel.

19. A drive module according to claim 18, comprising strengthening members within the channel, extending transversely of the channel and longitudinally of the conveyor, said strengthening members being where the drive units are connected to said center frame member.

20. A drive module according to claim 15, wherein the end frame members are of a length to fit substantially between a pair of longitudinally extending, laterally spaced apart center frame beams, and wherein the center frame member is adapted to set down on the center frame beams and to extend laterally outwardly from them, substantially to the side boundaries of the conveyor.

21. A drive module according to claim 20, wherein the end frame members have upper portions which in use project above the center frame beams, each upper portion having an upper surface, and wherein said center frame member has an upper surface at substantially the same level as the upper surfaces of the end frame members, and wherein longitudinally extending support and guide beams for conveyor slats are connected to the upper surfaces of the end frame members and the upper surface of the center frame member.

22. A drive module according to claim 21, wherein windows are formed between ends of support and guide beams which are connected to each end frame member and ends of support and guide beams which are connected to the center frame member, each of these windows providing access from above to two of the drive beams.

* * * * *

UNITED STATES PATENT AND TRADEMARK OFFICE
CERTIFICATE OF CORRECTION

PATENT NO. : 5,934,445
DATED : August 10, 1999
INVENTOR(S) : Raymond Keith Foster It is certified that error appears in the above-identified patent and that said Letters Patent is hereby corrected as shown below:

Col. 4, line 60, delete "other" and "surfaces" should be -- surface --.

Col. 4, line 61, "members" should be -- member --.

Col. 4, line 65, "provide" should be -- provides --.

Col. 6, line 49, "Fig. 29" should be -- Fig. 30 --.

Col. 10, line 29, "Fig. 33" should be -- Fig. 13 --.

Col. 13, line 11, "154 section 154" should be -- section 154 --.

Col. 15, line 28, "PFC-5" should be -- TSC-5 --.

Col. 15, line 34 "255" should be -- 254 --.

Col. 15, line 35, "256" should be -- 255 --.

Col. 16, line 29, "1," should be -- 1 --.

Claim 15, col. 22, line 22, "have" should be -- having --.

Claim 15, col. 22, line 29, delete the comma after "drive units".

Signed and Sealed this

Sixteenth Day of May, 2000

Attest:

Q. TODD DICKINSON

Attesting Officer

Director of Patents and Trademarks